(12) United States Patent
Belt et al.

(10) Patent No.: US 11,765,546 B2
(45) Date of Patent: Sep. 19, 2023

(54) SYSTEMS AND METHODS FOR LOCALIZED INFORMATION PROVISION USING WIRELESS COMMUNICATION

(71) Applicant: BLIND INSITES, LLC., Plano, TX (US)

(72) Inventors: Darwin Wayne Belt, Plano, TX (US); April Ryan Hilton, Carrollton, TX (US); Jeffrey D. Hilton, Carrollton, TX (US); Jessica B. Hipp, Temple, NH (US)

(73) Assignee: BLIND INSITES, LLC., Plano, TX (US)

( * ) Notice: Subject to any disclaimer, the term of this patent is extended or adjusted under 35 U.S.C. 154(b) by 10 days.

(21) Appl. No.: 17/555,653

(22) Filed: Dec. 20, 2021

(65) Prior Publication Data

US 2022/0272485 A1 Aug. 25, 2022
US 2023/0012467 A9 Jan. 12, 2023

Related U.S. Application Data

(63) Continuation of application No. 17/179,578, filed on Feb. 19, 2021, now Pat. No. 11,212,646, and a continuation-in-part of application No. 16/783,938, filed on Feb. 6, 2020, now Pat. No. 11,392,658.

(51) Int. Cl.
*G06F 16/9537* (2019.01)
*H04W 4/02* (2018.01)
*G06Q 10/109* (2023.01)

(52) U.S. Cl.
CPC ........ *H04W 4/025* (2013.01); *G06F 16/9537* (2019.01); *G06Q 10/109* (2013.01)

(58) Field of Classification Search
CPC ...... G06Q 10/109; H04W 4/025; H04W 4/90; H04W 4/021; G06F 16/9537; G06F 16/24565; G06F 16/9538
See application file for complete search history.

(56) References Cited

U.S. PATENT DOCUMENTS

| | | | |
|---|---|---|---|
| 9,648,581 B1 * | 5/2017 | Vaynblat | H04L 67/535 |
| 10,212,555 B1 * | 2/2019 | Rusu | G06F 16/9537 |
| 2018/0075063 A1 * | 3/2018 | Patel | G06F 16/387 |
| 2020/0168020 A1 * | 5/2020 | Kennedy-Foster | G06Q 30/0261 |

\* cited by examiner

*Primary Examiner* — Kris E Mackes
(74) *Attorney, Agent, or Firm* — CALDWELL INTELLECTUAL PROPERTY LAW

(57) ABSTRACT

A system for localized information provision using wireless communication, includes a computing device designed and configured to receive, from a wireless signal generator located in a navigable space, a location identifier, input at least a user-entered datum associated with the location identifier, instantiate a display data structure as a function of the at least a user-entered datum, wherein, the display data structure includes a plurality of data signals including the at least a user-entered datum, each display signal of the plurality of display signals includes a subset of a plurality of categories of data, and the display data structure includes a display order for the plurality of data signals, record at least an element of contextual data, and generate a localized data record, wherein the localized data record include display data structure, location identifier, and an association of the contextual data with the display order.

20 Claims, 7 Drawing Sheets

SYSTEMS AND METHODS FOR LOCALIZED INFORMATION PROVISION USING WIRELESS COMMUNICATION

CROSS-REFERENCE TO RELATED APPLICATIONS

This application is a continuation of Non-provisional application Ser. No. 17/179,578 filed on Feb. 19, 2021 and entitled "SYSTEMS AND METHODS FOR LOCALIZED INFORMATION PROVISION USING WIRELESS COMMUNICATION," the entirety of which is incorporated herein by reference.

FIELD OF THE INVENTION

The present invention generally relates to the field of telemetry, selective communication, and dynamic data storage. In particular, the present invention is directed to systems and methods for localized information provision using wireless communication.

BACKGROUND

Frequently, information a user needs is highly context dependent, relying on the user's immediate location and current needs, and may shift rapidly as the user progresses from one location or task to another. Traditional search engines and websites generally fail to provide relevant information in a sufficiently precise or intuitive manner.

SUMMARY OF THE DISCLOSURE

In an aspect, a system for localized information provision using wireless communication includes a computing device configured to download, at a first location, at least a portion of a localized data record associating at least an element of contextual data with a display data structure, to receive, from a wireless signal generator located at a second location, a location identifier, to retrieve the display data structure from the localized data record, to record at least an element of contextual data, and to instantiate the display data structure as a function of the at least an element of contextual data and the localized data record.

In another aspect, a method of localized information provision using wireless communication includes downloading, by a computing device and at a first location, at least a portion of a localized data record associating at least an element of contextual data with a display data structure, receiving, by the computing device and from a wireless signal generator located at a second location, a location identifier, retrieving, by the computing device, the display data structure from the localized data record, recording, by the computing device, at least an element of contextual data, and instantiating, by the computing device, the display data structure as a function of the at least an element of contextual data and the localized data record.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

Embodiments disclosed herein select display signals, such as provided to tabs or views on a user device, based on an identity of a local transmitter, which may be combined with one or more elements of contextual data such as user information or the like. Selection of a first display signal may be predicated, without limitation, upon emergency status, user habits, local schedule information, or combinations of multiple factors.

Figure 1:
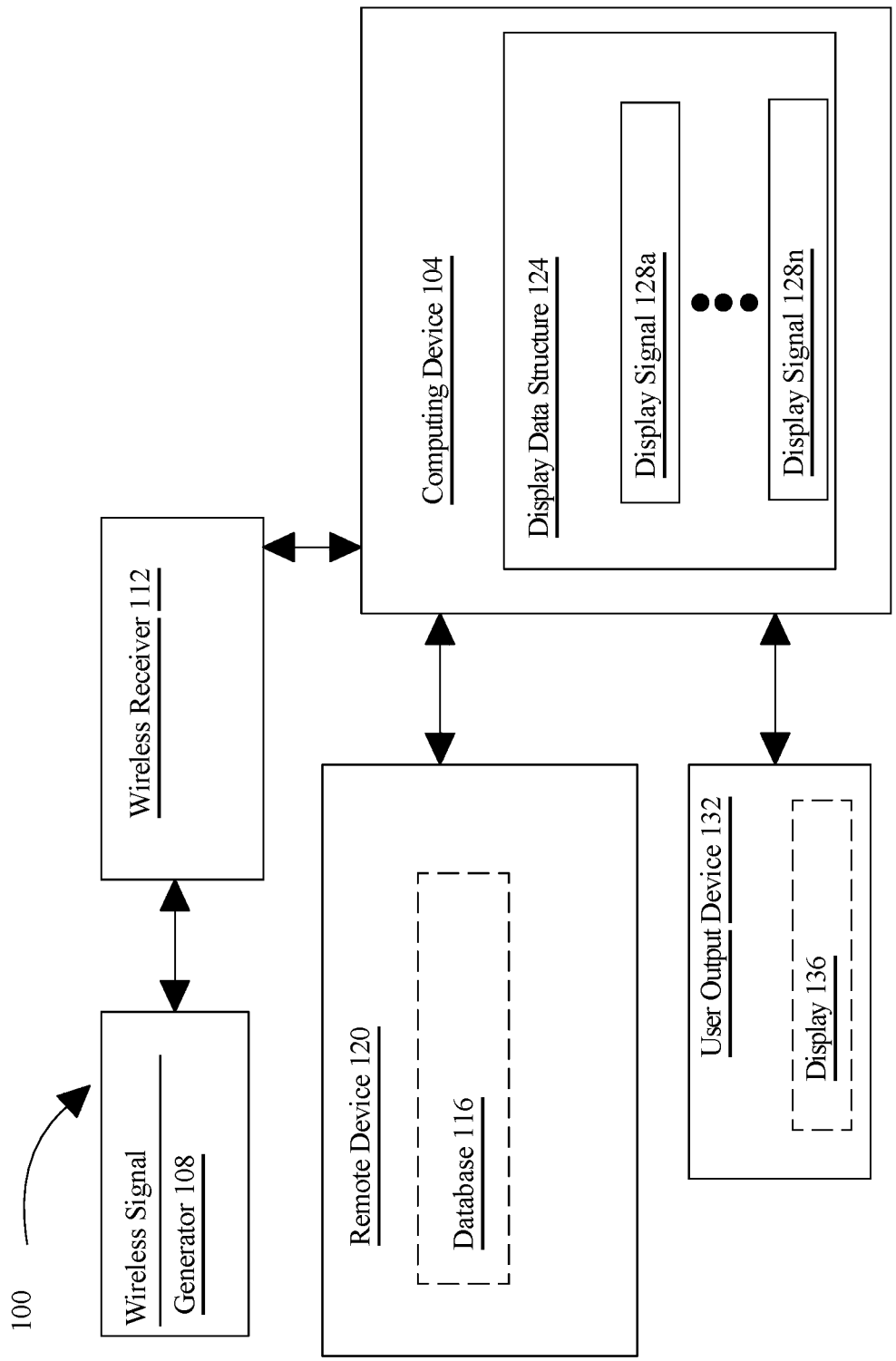
FIG. 1 is a block diagram of an exemplary embodiment of a system for localized information provision using wireless communication.

Referring now to FIG. 1, an exemplary embodiment of a system 100 for localized information provision using wireless communication is illustrated. System includes a computing device 104. Computing device 104 may include any computing device as described in this disclosure, including without limitation a microcontroller, microprocessor, digital signal processor (DSP) and/or system on a chip (SoC) as described in this disclosure. Computing device 104 may include, be included in, and/or communicate with a mobile device such as a mobile telephone or smartphone. Computing device 104 may include a single computing device operating independently, or may include two or more computing device operating in concert, in parallel, sequentially or the like; two or more computing devices may be included together in a single computing device or in two or more computing devices. Computing device 104 may interface or communicate with one or more additional devices as described below in further detail via a network interface device. Network interface device may be utilized for connecting computing device 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Computing device 104 may include but is not limited to, for example, a computing device or cluster of computing devices in a first location and a second computing device or cluster of computing devices in a second location. Computing device 104 may include one or more computing devices dedicated to data storage, security, distribution of traffic for load balancing, and the like. Computing device 104 may distribute one or more computing tasks as described below across a plurality of computing devices of computing device, which may operate in parallel, in series, redundantly, or in any other manner used for distribution of tasks or memory between computing devices. Computing device 104 may be implemented using a "shared nothing" architecture in which data is cached at the worker, in an embodiment, this may enable scalability of system 100 and/or computing device.

With continued reference to FIG. 1, computing device 104 may be designed and/or configured to perform any method, method step, or sequence of method steps in any embodiment described in this disclosure, in any order and with any degree of repetition. For instance, computing device 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Computing device 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Still referring to FIG. 1, computing device 104 is configured to receive, from a wireless signal generator 108 located in a navigable space, a location identifier. A "wireless signal generator," as used in this disclosure, is a device that outputs a signal using electromagnetic radiation; signal may be sent using any frequency usable in communication, including without limitation radio waves, microwaves, infrared waves, and visible light. At least a wireless signal generator 108 may include an antenna. At least a wireless signal generator 108 may include a passive transmitter, such as those used for passive radio frequency identification ("RFID") or near field communication ("NFC") tags. In some embodiments, a passive transmitter includes an antenna in which electric current is induced by magnetic coupling from an antenna, such as antenna of wireless receiver 112; the induced electric current may power the passive transmitter, which may use additional circuitry such as a logic circuit to analyze the signal and generate a response signal. Logic circuit may be any logic circuit as described above regarding driver circuit. At least a wireless signal generator 108 may output signal by modifying electromagnetic radiation using means other than an antenna. For instance, at least a wireless signal generator 108 may absorb and/or reflect ambient or directed electromagnetic radiation in visible or other spectra; wireless signal generator 108 may emit and/or reflect such electromagnetic radiation in spectrally altered pattern that may be detected using a code reader, antenna, or other device or component of wireless receiver 112. This may be accomplished, in a non-limiting example, using one or more pigments disposed on a surface of wireless signal generator 108; one or more pigments may include, as a non-limiting example, two or more contrasting pigments, which may be provided in a one-dimensional or two-dimensional distribution. Non-limiting examples of such pigmented arrangements may include quick-read codes and/or universal product codes, as rendered on physical objects, electronic displays, and the like.

Still referring to FIG. 1, a response signal may be output by the same antenna. A response signal may be output by an additional antenna; in other words, as described above for wireless transmitter, antenna may include multiple antennas. In some embodiments, a passive transmitter has a plurality of antennas to enable the transmitter to capture the signal optimally from a plurality of angles. The signal from the interrogator may contain no information, functioning solely to activate the passive transmitter. In other embodiments, the signal from the interrogator contains information that circuitry in the passive transmitter processes.

Continuing to refer to FIG. 1, wireless signal generator 108 may include an active transmitter. An active transmitter may be a transmitter having a power source other than an interrogation signal; power source may be any power source as described above. An active transmitter may use an antenna to broadcast a signal periodically. An active transmitter may use an antenna to listen for incoming signals and transmit in response to a detected signal. Active transmitter may perform both actions; for instance, active transmitter may periodically transmit a first signal, and also transmit one or more second signals in response to signals wireless signal generator 108 receives. Wireless signal generator 108 may include a transceiver, which may be any transceiver as described above. Wireless signal generator 108 may include a beacon using any beacon protocol as described above.

Still referring to FIG. 1, wireless signal generator 108 may include a memory. Memory may be any memory as described below. In some embodiments, memory is read-only. In other embodiments, memory may be writable. The writable memory may require authentication; for instance, the writable memory may be writable only given a password, identifier, key, or other data indicating that the device that will be modifying the memory is authorized. Memory may include any combination of the above; for instance, memory may include a read-only section. Memory may include a writable section with limited access. Memory may include a writable section with general access, to which any user may be able to write data. Memory may include the read-only section and the generally writable section, or the limited access writable section and the generally writable section, or the read-only section and the limited access section. The limited access section may be limited to users of the system 100, or in other words may be generally writable, but only to users of the system 100, who may have the requisite access codes as a result of joining the system 100 as users; the users may alternatively be granted the access codes by the system 100 to update information on wireless signal generator 108 only when authorized by the system, and otherwise be unable to update the memory; in this way, the system 100 may be able to update information on wireless signal generator 108 memory efficiently by way of the receiver while maintaining security against misuse of the memory. In some embodiments, preventing users from being able to write over memory enables the memory to be free from intentional or unintentional corruption or inaccuracy, and enables the system 100 to ensure that certain information is always available to users of wireless signal generator 108. In some embodiments, writable sections enable the system 100 itself or users of the system 100 to correct, augment, or update information as described in further detail below.

Continuing to refer to FIG. 1, at least a wireless signal generator 108 may be configured to transmit a signal. Signal may be a return signal in response to a prompt by another wireless communication device, including without limitation wireless receiver 112. Signal may be a return signal in response to interrogation by an interrogator included in another wireless communication device, including without limitation wireless receiver 112. Signal may be any wirelessly transmitted signal, including without limitation any signal transmitted through electromagnetic radiation, magnetic coupling, capacitive or other electronic coupling, or any other wireless means. Signal may include a location; identifier may identify at least a wireless signal generator 108, an item to which wireless signal is attached and/or with which wireless signal is associated, a location at which wireless signal generator 108 is located, or the like. A "location identifier," as used in this disclosure, is an identifier of a location of at least a wireless signal generator 108. Location identifier may identify a specific location; specific location may include, without limitation, a location to which at least a wireless signal generator 108 is attached or affixed, including a location relative to a navigable space and/or a location relative to an item. Specific location may be static; other features may be associated with specific location. Specific location may be location at and/or attached to an item, which may include a movable item such as a box, crate, portable appliance, element of furniture, bag, a vending machine, a trash or recycling receptacle or the like; thus, location identifier may identify a location that can move with the item to which it corresponds, as the item and wireless signal generator 108 are moved. References to "location-specific data" as made in this disclosure may further include and/or be read as references to item-specific data, which may include information concerning contents of an item, instructions for use of an item, instructions for assembly and/or maintenance of an item, information for accessibility and/or use of item given one or more forms of impairment such as visual and/or mobility impairment, or the like. Transmitters may alternatively or additionally be located at and/or associated with items that in turn are associated with a particular navigable space, but may or may not be at that particular navigable space; examples may include, without limitation, playbills associated with a concert hall, literature associated with a museum, church or organization, programs associated with a sports venue, menus associated with a restaurant, ads and mailers associated with a business, convention lanyards & handouts for or associated with events at a hotel or convention center, instructions at medical facilities such as without limitation a COVID-19 vaccine distribution center, or the like.

Still referring to FIG. 1, location identifier may take the form of a unique identifier that uniquely corresponds to at least a wireless signal generator 108 for the purposes of the system 100; this may be accomplished using methods including but not limited to Globally Unique Identifiers (GUIDs), Universally Unique Identifiers (UUIDs), which may be identifiers including numbers generated according to a standard which makes the chances of another UUID or GUID being identical to the instant identifiers negligible to the point of near-certain impossibility, or by maintaining a data structure, table, or database listing all transmitter identifiers and checking the data structure, table listing, or database to ensure that a new identifier is not a duplicate. A database may be operated, without limitation, at a remote device 120, on computing device 104, or in any other suitable manner.

Further referring to FIG. 1, an identifier of wireless signal generator 108 may alternatively or additionally identify a group of wireless signal generators including or included in at least a wireless signal generator 108. Group of wireless signal generators may be commonly owned; for instance, group of wireless signal generators may all be owned by a single person or entity. Owner of a transmitter and/or group of wireless signal generators may have exclusive ability to modify information publicly associated with transmitters, where information publicly associated with transmitters includes information linked to identifier in any data structure as set forth in further detail below, or stored and transmitted by the transmitter, and available to all users of computing device like computing device 104. Alternatively or additionally, rights to change publicly available information may be possessed by individuals and/or groups having particular authentication credentials or the like. Information on data structures as described herein may be organized according to owner identifiers and/or identifiers of groups of transmitters; in an embodiment, this manner of organization may make retrieval of data from data structures more efficient. For instance, and without limitation, owner identifier may be linked in a data structure or table to a location or identifier of a data structure and/or database relating to that owner identifier. As a further example, a single server or remote device, as described in further detail below, may include all information and/or data structure portions or instances pertaining to a particular owner identifier. As a non-limiting example one or more transmitters of at least a wireless signal generator 108 may be formatted owner identifiers in the textual element prior to provision of the one or more transmitters to the owner; alternatively or additionally a mechanism may be provided in an application or the like allowing an owner to format his or her own transmitters with the textual element identifying him or her as the owner. An owner, as used herein, may include any individual, entity, organization, venture, business, or the like, including without limitation a retail establishment or chain, a university, a hotel, a bank, an organization such as a nonprofit organization, a government, governmental organization, a quasi-governmental organization, a religious order and/or division thereof, an office and/or office space, or any other example that may occur to a person of ordinary skill in the art upon reviewing the entirety of this disclosure. As a non-limiting example, use of multiple transmitters by a single organization may be implemented as described in U.S. Nonprovisional application Ser. No. 16/861,940, filed on Apr. 29, 2020, and entitled "METHODS AND SYSTEMS FOR PROVIDING WIRELESS GUIDANCE IN A RETAIL SPACE," the entirety of which is incorporated by reference herein. A location identifier may be shared, without limitation, by the entirety of an organization, all locations of an organization, all locations of an organization on a single continent and/or in a single country, state, site, and/or any combination thereof. Signal may include other data in addition to identifier.

With continued reference to FIG. 1, data to be transmitted by at least a wireless signal generator 108 may be stored on at least a wireless signal generator 108 in any format conducive to its storage and transmission. Data may be stored in binary form; the binary storage may be any encoding of information. Data may be organized into formats such as network packets, fixed-length strings, XML, or any other form. Persons skilled in the art, upon reading the entirety of this disclosure, will be aware of many different ways in which data may be stored on at least a wireless signal generator 108 and/or computing device 104.

Still referring to FIG. 1, computing device 104 may receive location identifier from wireless signal generator 108 via a remote device, such as another computing apparatus as described in this disclosure, which may transmit location identifier to computing device 104 by way of a network and/or by any direct and/or indirect form of electronic communication. Alternatively or additionally, computing device 104 may receive location identifier from wireless signal generator 108 by localized wireless communication. For instance, and without limitation, computing device 104 may incorporate and/or otherwise be in communication with a wireless receiver 112, where "in communication" signifies ability to send signals to, and receive signals from, wireless receiver 112, either directly or via an intermediate device. For instance, and without limitation, wireless receiver 112 may be incorporated in an additional computing device 104 such as a user mobile phone, smartphone, tablet, personal digital assistant, and/or any other computing device 104, computing device 104, receiver, or device as described anywhere in this disclosure, which may connect to computing device 104 via a network, which may be a local area network, a wide area network, the Internet, or any other network passing electronic wired and/or wireless communication between devices. Computing device 104 may be electronically coupled to wireless receiver 112, and/or in wireless communication with wireless receiver 112; computing device 104 may perform wireless communication with wireless receiver 112 using any suitable protocol, including without limitation BLUETOOTH protocols as described below.

Continuing to refer to FIG. 1, wireless receiver 112 may have an antenna. Wireless receiver 112 may include a wireless interrogator; in other words, the antenna may be capable of inducing a current in an antenna of a passive transmitter through magnetic coupling, capacitive coupling, or other means. Wireless receiver 112 may be able to receive the signal transmitted by one or more transmitters as described below using the antenna. In some embodiments, the wireless receiver 112 can transmit as well as receive signals. Wireless receiver 112 may include a transceiver, which both sends and receives signals; the transceiver may be a system on a chip, including processing, memory, or any other functions together in a single integrated circuit. Transceiver may exchange signals according to existing protocols, such as the BLUETOOTH protocol promulgated by Bluetooth SIG, Inc. of Kirkland, Wash. Transceiver may further implement a "beacon" protocol; as a non-limiting example, the beacon protocol may be implemented using the IBEACON protocol produced by Apple, Inc. of Cupertino, Calif., the EDDYSTONE protocol produced by Google, Inc. of Mountain View, Calif., or a similar protocol. Antenna may include a plurality of antennas; for example, and without limitation, antenna may include a first antenna that transmits interrogation signal, and a second antenna that receives return signal. Antenna may include multiple antennas that receive and/or transmit signals; for instance, antenna may include antennas facing in various directions for transmitting interrogation signals and receiving return signals to and from various directions simultaneously. Similarly, wireless receiver 112 may include both an antenna for receiving from and/or transmitting signals to a transmitter and a transceiver that may be used for communicating with a mobile computing device 104, for instance as described below. Wireless receiver 112 may include any device capable of or configured to receive any signal in the form of electromagnetic radiation, including without limitation visible spectrum light, infrared light, radio waves, or signals in any other portion of the electromagnetic spectrum, capacitive or magnetic inductance, or any other form of wireless communication that may be established between two electronic devices or components.

In an embodiment, and still referring to FIG. 1, wireless receiver 112 may scan wireless signal generator 108 using one or more optical and/or radiation-based scanning protocols and/or components. For instance, and without limitation wireless receiver may include and/or utilize one or more components performing light detection and ranging (LIDAR) processes. LIDAR may scan and/or return three-dimensional shapes and/or distances in three dimensions. In an embodiment, wireless signal generator 108 may include a three-dimensional form; wireless receiver 112 may be trained to lock on such a three-dimensional shape and return a specific location thereof and/or information encoded in a shape thereof within a set tolerance. In an embodiment, system 100 and/or any component of system may utilize location of computing device, as determined according to any process and/or technology described herein including without limitation GPS and use LIDAR to determine a relative location wireless signal generator 108. System 100 may alternatively or additionally use triangulation of multiple three-dimensional markers at locations of at least a wireless signal generator 108. Information encoded on such three-dimensional shapes may include any location identifier, which may alternatively or additionally be determined by location-detection means using LIDAR and/or other processes described herein.

Still referring to FIG. 1, wireless receiver 112 may include a driver circuit. Driver circuit is an electric circuit, electrically coupled to antenna, that processes electric signals induced in antenna by wireless signals and processes the electric signals. In other words, driver circuit may be any electrical circuit configured to wirelessly receive a signal from a transmitter, as described in further detail below, via antenna. Where wireless receiver 112 includes a wireless interrogator, driver circuit may further be configured to wirelessly transmit an interrogation signal via the antenna to a passive transponder; the interrogation signal may provide electrical power to the passive transponder. Driver circuit may further be configured to wirelessly receive a return signal from the transponder via the antenna.

With continued reference to FIG. 1, driver circuit may include analog components, digital components, or both. For instance, driver circuit may include one or more filters (not shown), such as a Butterworth filter, a Chebyshev filter, a band filter, or the like, to filter out noise or selectively receive particular frequencies or ranges of frequencies. Driver circuit may include one or more amplifiers. Driver circuit may include a logic circuit, or a circuit including at least one digital circuit element. Logic circuit may be hardwired; for instance, logic circuit may include logic hardware circuit components such as logic gates, multiplexors, demultiplexors, programmable circuits such as field-programmable arrays, read-only memory, and the like.

Logic circuit may include memory, which may be any memory as described below in reference to FIG. 4. Logic circuit may include a computing device 104 as described below in reference to FIG. 4. In some embodiments, the wireless receiver 112 includes a computing device 104; the computing device 104 may be any computing device 104 as described below in reference to FIG. 4. As a non-limiting example, the wireless receiver 112 may be a mobile computing device 104 such as a mobile phone, "smartphone," "smartwatch," or tablet; wireless receiver 112 may be incorporated in a mobile computing device 104. Wireless receiver 112 may be incorporated in a special-purpose device, such as handheld device or device mounted on a finding aid that, as a non-limiting example, is wirelessly or otherwise coupled to a mobile or computing device 104. Computing device 104 may be a microcontroller.

Still referring to FIG. 1, wireless receiver 112 may include a power source. Power source may include a power storage device; the power storage device may include a battery. Power storage device may include a capacitor; for instance, the power storage device may include an ultra-capacitor. Power storage device may include a magnetic power storage device, such as a device that incorporates an inductor. In some embodiments, power source includes a photovoltaic device; the photovoltaic device may be any device that converts light to electric power. Power source may include power provided by an electrical network, for example including electric power accessed via a wall-plug; the electrical power may be alternating current "mains" power, or power generated by solar panels, wind turbines. Wireless receiver 112 may charge wirelessly; for instance, the wireless receiver 112 may charge inductively. Wireless receiver 112 may include an inertial power source that generates mechanical or electrical power from movement of wireless receiver 112, including without limitation an inertial power source that generates power from walking or swinging a cane on which inertial power source is mounted. Wireless receiver 112 may include an optical capture device, such as a camera, optical scanner, laser scanner, or the like.

With continued reference to FIG. 1, wireless receiver 112 is configured to receive a signal from at least a wireless signal generator 108. In some embodiments, where at least a wireless signal generator 108 includes a passive transmitter as described in further detail below, wireless receiver 112 may receive the signal by producing an interrogation signal using an interrogator, and receiving the signal generated by the passive transmitter in return. In other embodiments, where at least a wireless signal generator 108 includes an active transmitter as set forth in further detail below, wireless receiver 112 listens for the transmission frequency of at least a wireless signal generator 108 and inputs the signal upon receiving the signal output by at least a wireless signal generator 108. Wireless receiver 112 may exchange signals with at least a wireless signal generator 108; for instance, wireless receiver 112 may transmit a query to at least a wireless signal generator 108 and receive data in response to the query. Wireless receiver 112 may similarly receive a signal from a second transmitter or from additional transmitters situated in a navigable space, as described in further detail below. Wireless receiver 112 may be configured to receive content data from at least a wireless signal generator 108 or a second transmitter. In an embodiment, and as described above, computing device 104 may be configured to receiving location identifier by wirelessly transmitting, via an antenna communicatively connected to the computing device 104, an interrogation signal providing electrical power to the wireless signal generator 108 and wirelessly receiving from the wireless signal generator 108, and via the antenna, a return signal.

Alternatively, or additionally, and still referring to FIG. 1, wireless receiver 112 may have a code reader. In some embodiments, a code reader may be any device capable of reading a visual code such as a UPC laser-scanned code or a quick read ("QR") code. In some embodiments, the code reader is a laser scanner. In other embodiments, the code reader is an optical device such as a camera; for instance, where wireless receiver 112 is a mobile device such as a mobile phone or tablet, or is coupled to such a device, the code reader may be the camera of the mobile device. The mobile device may be configured to input a QR or UPC code using the camera and then extract the data contained in the code using software. In any embodiment of methods, systems, and/or devices described herein in which wireless receiver 112 receives a return signal including a unique identifier and processes that return signal, wireless receiver 112 may similarly obtain the unique identifier by way of a code reader and process the unique identifier in a like manner.

In an embodiment, and further referring to FIG. 1, one or more data entries in data structures described herein, including without limitation wireless signal generator 108, a database, a data record, and/or portable computing device may be encrypted and/or decrypted using a cryptographic system. In one embodiment, a cryptographic system is a system that converts data from a first form, known as "plaintext," which is intelligible when viewed in its intended format, into a second form, known as "ciphertext," which is not intelligible when viewed in the same way. Ciphertext may be unintelligible in any format unless first converted back to plaintext. In one embodiment, a process of converting plaintext into ciphertext is known as "encryption." Encryption process may involve the use of a datum, known as an "encryption key," to alter plaintext. Cryptographic system may also convert ciphertext back into plaintext, which is a process known as "decryption." Decryption process may involve the use of a datum, known as a "decryption key," to return the ciphertext to its original plaintext form. In embodiments of cryptographic systems that are "symmetric," decryption key is essentially the same as encryption key: possession of either key makes it possible to deduce the other key quickly without further secret knowledge. Encryption and decryption keys in symmetric cryptographic systems may be kept secret and shared only with persons or entities that the user of the cryptographic system wishes to be able to decrypt the ciphertext. One example of a symmetric cryptographic system is the Advanced Encryption Standard ("AES"), which arranges plaintext into matrices and then modifies the matrices through repeated permutations and arithmetic operations with an encryption key.

Continuing to refer to FIG. 1, in embodiments of cryptographic systems that are "asymmetric," either encryption or decryption key cannot be readily deduced without additional secret knowledge, even given the possession of a corresponding decryption or encryption key, respectively; a common example is a "public key cryptographic system," in which possession of the encryption key does not make it practically feasible to deduce the decryption key, so that the encryption key may safely be made available to the public. An example of a public key cryptographic system is RSA, in which an encryption key involves the use of numbers that are products of very large prime numbers, but a decryption key involves the use of those very large prime numbers, such that deducing the decryption key from the encryption key requires the practically infeasible task of computing the prime factors of a number which is the product of two very large prime numbers. Another example is elliptic curve cryptography, which relies on the fact that given two points P and Q on an elliptic curve over a finite field, and a definition for addition where A+B=−R, the point where a line connecting point A and point B intersects the elliptic curve, where "0," the identity, is a point at infinity in a projective plane containing the elliptic curve, finding a number k such that adding P to itself k times results in Q is computationally impractical, given correctly selected elliptic curve, finite field, and P and Q.

Further referring to FIG. 1, a user providing user-entered data, and/or a computing device operated thereby, may encrypt user-entered data; decryption may be available to a user, user group, or other entity or group of entities permitted to access information, data records, display data structures, and/or display signals as described in further detail below.

Still referring to FIG. 1, computing device 104 may be designed and configured to parse a signal received from at least a wireless signal generator 108 for at least a textual element. Computing device 104 may be designed and configured to receive first signal from at least a wireless signal generator 108; receiving a signal from a transmitter, as described herein, may include receiving signal via receiver, as communicatively connected to computing device 104 as described above. For instance, a receiver connected directly, wirelessly, or via a network to computing device 104 may receive a signal from a transmitter via passively or actively scanning transmitter, and then relay that signal to the computing device 104; e.g., a first user may scan or otherwise receive a signal from a transmitter using a first computing device 104, such as a smartphone, which may then transmit the signal, or a message based on the signal, to computing device 104. At least a textual element may include any datum or data that may be rendered as text, including without limitation numerical text, as any character or string of characters in any written language, as any punctuation, diacritical symbols, or other markings associated with any form of written text, and the like. Textual data may include a unique identifier such as without limitation location identifier.

Further referring to FIG. 1, wireless signal generator 108 is located in a navigable space. A navigable space may include, without limitation, any navigable space as described in U.S. Nonprovisional application Ser. No. 16/783,938, filed on Feb. 6, 2020 and entitled "METHODS AND SYSTEMS FOR WIRELESS ACQUISITION AND PRESENTATION OF LOCAL SPATIAL INFORMATION," the entirety of which is incorporated herein by reference. Navigable space may include, for instance and without limitation a room containing wireless signal generator 108, such as without limitation an office, a classroom, a cafeteria, an exercise room, a dance room, a multipurpose room, a lecture hall, a laboratory, a game room, bathroom, storage room, or the like. Navigable space may include, without limitation, an inter-room space such as a corridor, atrium, lobby, or court. Navigable space may include without limitation a stadium, arena, rink, convention center, warehouse, data center, office, dining hall, restaurant, dining hall, concert hall, auditorium, retail space, building, office park, and/or campus. As noted above, navigable spaces may be nested within one another. For instance, a navigable space containing wireless signal generator 108 may include a room that is contained on a floor, in an office, in a suite of rooms, or the like, which may represent a navigable space within which navigable space containing wireless signal generator 108 may be nested; such a navigable space may be nested in another navigable space, amounting to any number of nesting levels. For example, and without limitation, a suite or office may be nested in a floor, which may be nested in a building, which may be nested in a campus, office park, or other set of buildings, or the like. As noted above, navigable spaces may be adjacent to one another. For instance, where navigable space is a room and/or lecture hall, an adjoining room, corridor, atrium, lobby, or the like may be an adjacent navigable space. Adjacent and navigable spaces may be combined in various ways that will occur to persons skilled in the art upon reviewing the entirety of this disclosure. For instance, and without limitation, a number of adjacent rooms, and/or a number of rooms connected to a space adjacent to each room, such as a corridor, atrium, and/or lobby, may be nested and/or contained within a navigable space such as a suite and/or floor. Computing device 104 may be located in navigable space and/or may be located in a different location. For instance, and without limitation, location of wireless signal generator 108 may be same location as that of computing device 104. Navigable spaces may be nested. As used in this disclosure, "nesting" means one nesting level outside, or in other words a first navigable space is "nesting" a second navigable space where the first navigable space contains the second navigable space. Similarly, a first navigable space is "nested" in a second navigable space where the first navigable space is nested within the second navigable space. In context of a navigable space representing a subject of a sentence or paragraph, a "nested navigable space" is a navigable space nested within the instant navigable space, while a "nesting navigable space" is a navigable space in which the instant navigable space is nested.

Still referring to FIG. 1, a navigable space may include, without limitation, one or more interiors of vehicles and/or other moving and/or movable objects and/or locations, such as cars, buses, trains, subways, planes, space stations, ships, or the like. Navigable space may include, without limitation, one or more outdoor spaces, such as trails including without limitation running, hiking, biking or other trails, parks such as sports parks, recreational parks, theme parks, forests, mountains, canyons, caverns, or national parks, parking lots, transportation hubs, cemeteries, grave markers, or the like. Navigable space may alternatively or additionally include a plurality of non-contiguous sites that are commonly owned and/or managed, such as state or nationally owned historical markers, bus stops owned by a transit company or agency, street signs owned by a municipality, and/or utility connections such electric, gas, water and sewer, fire hydrants, electrical and/or light poles.

Still referring to FIG. 1, wireless signal generator 108 may be located at any suitable location. Location may include, without limitation, any fixed location as described above. Location may include, without limitation, any location at an item in navigable space as described above. As a non-limiting example, in a navigable space and/or room containing seats and/or desks, such as without limitation a stadium, classroom, lecture hall, restaurant, concert hall, or the like, a location of wireless signal generator 108 may be at one or more seats and/or desks; each of a plurality of seats and/or desks may have a wireless signal generator 108 located thereat, where plurality may be all seats and/or desks in navigable space and/or all seats and/or desks belonging to a given group, classification, or the like. In an embodiment, if a user sits at one such seat and/or desk, a first receipt of a signal from wireless signal generator 108 may prompt computing device 104 to "check in" user as located at the seat and/or desk, permitting communication with and/or data provided to computing device 104 to be modified by and/or relevant to a location at the seat and/or desk. Location may include without limitation a location along a wall, at an exit, at an entrance, at a lectern, at a blackboard, or the like. Location may include a location at a bank or panel of equipment, such as a control panel and/or control apparatus for a projector, sound system, lighting control system, or the like. Persons skilled in the art, upon reviewing the entirety of this disclosure, will be aware of various alternative or additional locations where a wireless signal generator 108 may be located within a navigable space.

With continued reference to FIG. 1, computing device 104 is configured to input at least a user-entered datum associated with the location identifier. User-entered data may include any data input by a user, using any device for user input including without limitation using manual input devices such as touchscreens, keyboards, mice, touchpads, or the like, audio input devices such as microphones, which may convert speech to text to generate textual data, and/or any other device usable to input user-entered data. User-supplied data may include content data, such as text, images, video, and/or audio inputs captured using computing device 104 and/or a camera, audio input device, or the like communicatively connected to computing device 104, local and/or network-based location of text images, video files and/or streams, audio files and/or streams, or the like, for instance using uniform resource locators (URLs), file directories, or the like. User-supplied data may include contextual data, including without limitation any contextual data as described in this disclosure. Alternatively, computing device may capture a snapshot of current contextual data at the moment of capture, using user-entered data, location data, data describing user, and the like. User-entered data may be entered, without limitation, by an administrator of an organization, an individual owner and/or operator of computing device, an owner and/or operator of a remote device, or any other user. User-entered data may be entered directly and/or as a reference and/or link to a database, data structure, an element of data therein, and/or any machine-stored and/or machine-generated data and/or data location. User-entered data may be captured using at least camera, microphone, and/or other data capturing device. User-entered data may include any data including without limitation data in video and/or audio format, textual data, image data, and/or data formatted and/or stored for use in augmented reality, virtual reality, or the like.

Still referring to FIG. 1, user-entered data may include one or more elements of stylistic data. "Stylistic data," as used in this disclosure, is data dictating stylistic features of a display data structure as described in further detail below. For instance, and without limitation, where a display data structure has a visual component such as a graphical user interface, stylistic data may include fonts, font sizes, and/or text colors of textual data, background colors or images, text formatting instructions such as indentations, spacing, or the like, highlight colors, justification such as left, center, or other justification, line-spacing, rotation of text to horizontal, vertical or other angles, heading levels, bullet levels, number lists, tables, styles of hyperlinks, styles of buttons, checkboxes, or other items used as event handlers, or the like. As a further non-limiting example, where a display data structure includes an audio output component, audio stylistic data may include an initial or default volume, a mix of volume levels at different frequency ranges, one or more audio frequency filters such as high pass, low pass, bandpass, and/or other analog or digital filters, an acceptable distortion level, compression encoding and/or decoding parameters, encoding and/or decoding protocols, or the like. Stylistic data may include instructions for haptic output and/or feedback. Stylistic data may include shortcuts for user data entry such as for data entry and/or manipulation via gestures as captured optically, keystrokes, gestures on a touch-sensitive data entry device, alternative keystrokes, or the like. As an additional non-limiting example, where display data structure includes a video output component, video stylistic data may include chroma and/or luma brightness levels, overall picture brightness level, color filters, resolution, compression encoding and/or decoding parameters, encoding and/or decoding protocols, or the like. Stylistic data may include styles of calendar, dates, time fields, phone numbers, outlines, inputs to emails, bookmarks, tables of contents, templates, and/or formulas. As an additional non-limiting example, where display data structure includes one or more images, stylistic data may include chroma and/or luma brightness levels, overall picture brightness level, color filters, resolution, compression encoding and/or decoding parameters, encoding and/or decoding protocols, or the like. Stylistic data may include styles of controls for and/or abilities to perform editing functions such as deletion, copying, insertion of material, and/or moving elements. Further referring to FIG. 1, user input data may include one or more elements of position data. "Position data," as used in this disclosure, is data dictating a position and/or order of display and/or output of data in a display data structure as described in further detail below. Distinct blocks of data may be defined on a display data structure and ordered according to position data. For instance and without limitation, one or more text blocks may define blocks of textual data, one or more image blocks may define blocks of image data, one or more audio output blocks may define one or more lots of audio output data, and/or one or more video output blocks may define one or more blocks of video output data. A block may have more than one output modality; for instance, a text block may be output either as visible text or as an audio output such as a text-to-speech output, while an image may include an "alt text" datum that describes one or more elements in the image for persons who cannot view the image due to visual impairments, or because of a need to focus visually elsewhere (e.g., because a person in question is operating a vehicle or other device demanding visual attention). Position data may establish a visual order, which may be defined as an order in which blocks of data occur on a page or view of a display data structure. For instance, position data may describe an order in which tabs or other display signals as described in further detail below should appear, an order in which text, images, video windows, or the like should appear while traversing a view, or the like. Position data may alternatively or additionally establish a temporal order, where a "temporal order" is defined as an order in which data are output. For instance, position data may establish a sequence in which blocks of data are output in audio, tactile, or other forms. In an embodiment, this may enable a person who is blind or visually impaired to "look up and down" a view to become informed concerning what is available on the view in a sequence, such as a sequence from top to bottom.

Still referring to FIG. 1, position data may be provided by user implicitly and/or explicitly. As a non-limiting example of implicit input of position data, user-entered data may be input in an input order. Computing device 104 may be configured to generate position data based on input order. For instance, a temporal output order of blocks may cause the data of the blocks to be output in an order in which they were input. Spatial and/or display order of blocks may be established according to input order, for instance by setting a temporal reading order in which a user is expected to read or view visual data; temporal reading order may, as a non-limiting example, be a right-to-left reading and perusal order that proceeds down the page and wraps back to the left upon each arrival at a rightmost edge of a view; persons skilled in the art, upon reviewing the entirety of this disclosure, will be aware of various alternative and/or additional protocols for visual ordering, each of which is contemplated as being within the scope of the instant disclosure. In an embodiment, temporal order may be established by traversal in such a traversal order by an output algorithm, such as an audio and/or tactile output algorithm, of elements in a display signal and/or display data structure.

In an alternative or additional embodiment, and with continued reference to FIG. 1, position data may be received as explicit position data. For instance, and without limitation, a user may dictate and/or otherwise indicate an order in which each block should appear relative to other blocks; for instance, user may click and drag on blocks, select blocks without limitation using a locator such as a mouse or touchscreen and/or verbally and command that the block be moved relative to other blocks with a "move up one," "move down one," "move to the top," "move to the bottom," or other command, to alter relative positions of blocks. In some embodiments, above-described features may provide users with a flexible way to create a series of blocks or pieces to create a "document" including headings, images, text, audio clips or the like.

Still referring to FIG. 1, user-entered data, and/or other items, such as display signals and/or data records, generated therewith or therefrom and/or associated therewith, may be associated with location identifier, and/or with one or more additional location identifiers. Additional location identifiers may be associated with user-entered data, and/or other items, such as display signals and/or data records, generated therewith or therefrom and/or associated therewith by user-entered data, such as an input directly identifying an additional location identifier, an input establishing a relationship between location identifiers as described above, and/or an input identifying other data structures such as other user-entered data, and/or other items, such as display signals and/or data records, generated therewith or therefrom and/or associated therewith, which are in turn associated with additional location identifier or identifiers. For instance, where user incorporates a first user-entered datum, and/or other items, such as display signals and/or data records, generated therewith or therefrom and/or associated therewith, in a second user-entered datum, and/or other items, such as display signals and/or data records, generated therewith or therefrom and/or associated therewith, any location, one or more location identifiers associated with first user-entered datum, and/or other items, such as display signals and/or data records, generated therewith or therefrom and/or associated therewith may be associated with second user-entered datum, and/or other items, such as display signals and/or data records, generated therewith or therefrom and/or associated therewith; a user may be able to remove and/or add any associations by further user input. Where location is and/or is associated with a group identifier and/or has any other relationship with other location identifiers and/or wireless signal generators, any such relationships may further relate user-entered data, and/or other items, such as display signals and/or data records, generated therewith or therefrom and/or associated therewith to such additional location identifiers and/or wireless signal generators.

Still referring to FIG. 1, computing device 104 is configured to instantiate a display data structure 124 as a function of the at least a user-entered datum. A "display data structure," as used in this description, is a data structure that instructs a user interfacing component, for instance as described in further detail below, to output one or more display signals. For instance, a display data structure 124 may include a graphical user interface (GUI), a voice user interface (VUI), a tangible or tactile user interface, or the like. Display data structure 124 includes a plurality of display signal. A "display signal," as used herein, is a set of data to be displayed at a user output component. A display signal may include instructions for display of data. Non-limiting examples of display signals 128a-n may include "tabs," "views," windows, or the like. Display data structure 124 may be instantiated using one or more objects, memory locations and/or functions, using any suitable format, including, as a non-limiting example, Java server pages (jsps), a PHP: hypertext processor (PHP) page, an HTML page, or a collection of multiple such pages for web development, one or more graphics programs and/or data for a native application, or the like.

With continued reference to FIG. 1, each display signal of plurality of display signals 128a-n may include a subset of the plurality of categories of data, as described above. In an embodiment, and as a non-limiting example, each subset of plurality of display signals 128a-n may differ from each other subset of the plurality of display signals 128a-n; in other words, each display signal may contain, for each other display signal, at least one element of data not present on the other display signal. Plurality of display signals 128a-n may include, without limitation, a data signal for each group of a plurality of groupings of categories. As a non-limiting example, plurality of display signals 128a-n may include a display signal for map display and/or exploration. Plurality of display signals 128a-n may include a display signal for navigation instructions, which may include without limitation instructions that have accessibility info.

Still referring to FIG. 1, categories of data may include groupings of data by navigable space; for instance, first a category may include data describing contents of navigable space containing first transmitter, such as locations of objects such as architectural and/or user features within the navigable space and/or other information regarding the navigable space, while a second category may include data describing contents of an adjacent navigable space and/or a navigable space in which the navigable space containing the first transmitter is nested. Categories of data may include groupings of data according to functions of elements described, such as without limitation a grouping of data describing electrical systems such as wiring, outlets, lighting, lighting controls, computer controls, audio equipment, speakers, banks of speakers or lights, or the like, a grouping of data describing plumbing systems such as pipes, sinks, toilets, fountains, plumbing fixtures, or the like, a grouping of data describing accessibility features such as accommodations for wheelchairs, accommodations for sensory impairment such as without limitation visual or hearing impairment, or the like, groupings of data according to map information such as exits, passages such as corridors between navigable spaces, passages or paths between buildings, ways to change levels or floors (e.g. stairs, elevators, ramps, and the like), groupings of data according to category of usage, such as data differentiating between dining areas, retail spaces, restrooms, classrooms, entertainment centers, performance centers, laboratories, practice rooms, and the like, groupings of data including service information and/or contact links, such as may be used to peruse service and/or product offerings such as menus or the like and/or to order such products and/or services groupings of data according to path information such as navigation instructions as described above, groupings of data according to usage instructions as described above, groupings of data according to temporal information, such as a schedule for use of a navigable space and/or spaces, including without limitation class schedules, lecture schedules, games, concerts, reservations of rooms, seats, and the like, groupings of data according to emergency information, such as emergency exits, emergency procedures such as evacuation procedures, emergency equipment, or the like. Data may include safety data, such as descriptions of evacuation routes, emergency exits, locations of fire alarms, defibrillators, fire extinguishers, fire doors, or the like.

With continued reference to FIG. 1, categories may include intersections or combinations of groupings of data. Categories may include, as a non-limiting example a first category for locations of objects such as architectural and/or user features in navigable space containing first transmitter and one or more second categories for locations of objects such as architectural and/or user features in an adjacent, nesting, or nested navigable space. Categories may include, as another non-limiting example, a first category for grouping of data describing electrical systems such as wiring, outlets, lighting, lighting controls, computer controls, audio equipment, speakers, banks of speakers or lights, or the like in navigable space containing first transmitter and one or more second categories for groupings of data describing electrical systems such as wiring, outlets, lighting, lighting controls, computer controls, audio equipment, speakers, banks of speakers or lights, or the like in an adjacent, nesting, or nested navigable space. Categories may include, as another non-limiting example, a first category for grouping of data describing plumbing systems such as pipes, sinks, toilets, fountains, plumbing fixtures, or the like in navigable space containing first transmitter and one or more second categories for groupings of data describing electrical systems such as wiring, outlets, lighting, lighting controls, computer controls, audio equipment, speakers, banks of speakers or lights, or the like in an adjacent, nesting, or nested navigable space. Categories may include, as another non-limiting example, a first category for a grouping of data describing plumbing systems such as pipes, sinks, toilets, fountains, plumbing fixtures, or the like in navigable space containing first transmitter and one or more second categories for groupings of data describing plumbing systems such as pipes, sinks, toilets, fountains, plumbing fixtures, or the like in an adjacent, nesting, or nested navigable space.

Still referring to FIG. 1, categories may include, as another non-limiting example, a first category for a grouping of data describing accessibility features such as accommodations for wheelchairs, accommodations for sensory impairment such as without limitation visual or hearing impairment, or the like in navigable space containing first transmitter and one or more second categories for groupings of data describing accessibility features such as accommodations for wheelchairs, accommodations for sensory impairment such as without limitation visual or hearing impairment, or the like in an adjacent, nesting, or nested navigable space. Categories may include, as another non-limiting example, a first category for a grouping of data according to map information such as exits, passages such as corridors between navigable spaces, passages or paths between buildings, ways to change levels or floors (e.g. stairs, elevators, ramps, and the like) in navigable space containing first transmitter and one or more second categories for groupings of data according to map information such as exits, passages such as corridors between navigable spaces, passages or paths between buildings, ways to change levels or floors (e.g. stairs, elevators, ramps, and the like) in an adjacent, nesting, or nested navigable space. Categories may include, as another non-limiting example, a first category for a grouping of data according to category of usage, such as data differentiating between dining areas, retail spaces, restrooms, classrooms, entertainment centers, performance centers, laboratories, practice rooms, or the like in navigable space containing first transmitter and one or more second categories for groupings of data according to category of usage, such as data differentiating between dining areas, retail spaces, restrooms, classrooms, entertainment centers, performance centers, laboratories, practice rooms, or the like in an adjacent, nesting, or nested navigable space. Categories may include, as another non-limiting example, a first category for service information and/or contact links, such as may be used to peruse service and/or product offerings such as menus or the like and/or to order such products and/or services in navigable space containing first transmitter and one or more second categories for service information and/or contact links, such as may be used to peruse service and/or product offerings such as menus or the like and/or to order such products and/or services in an adjacent, nesting, or nested navigable space.

With continued reference to FIG. 1, categories may include, as another non-limiting example, a first category for a grouping of data according to path information such as navigation instructions as described above in navigable space containing first transmitter and one or more second categories for groupings of data according to path information such as navigation instructions as described above in an adjacent, nesting, or nested navigable space. Categories may include, as another non-limiting example, a first category for a grouping of data according to usage instructions as described above, groupings of data according to temporal information, such as a schedule for use of a navigable space and/or spaces, including without limitation class schedules, lecture schedules, games, concerts, reservations of rooms, seats, and the like in navigable space containing first transmitter and one or more second categories for groupings of data according to usage instructions as described above, groupings of data according to temporal information, such as a schedule for use of a navigable space and/or spaces, including without limitation class schedules, lecture schedules, games, concerts, reservations of rooms, seats, and the like in an adjacent, nesting, or nested navigable space. Items may include items stored on site, such as inventory, hazardous materials, construction materials while under construction, traveling exhibits, employees, patients, visitors, livestock, plants, rented items and rented from or to who. Items may include work assignments of employees and/or contractors. Items may include schedules of conferences, room equipment layout, bus or train schedules. Categories may include, as another non-limiting example, a first category for a grouping of data according to emergency information, such as emergency exits, emergency procedures such as evacuation procedures, emergency equipment, or the like in navigable space containing first transmitter and one or more second categories for groupings of data according to emergency information, such as emergency exits, emergency procedures such as evacuation procedures, emergency equipment, or the like in an adjacent, nesting, or nested navigable space. Categories may further include any combination of intersections of groupings as described above, such as without limitation accessibility, wiring, plumbing, path, or other information for all rooms on a floor or in a building, or the like.

Still referring to FIG. 1, plurality of display signals 128a-n may include a display signal for each grouping of a plurality of groupings of categories; a non-limiting example of such groupings may include, without limitation, a grouping of categories relating to accessibility, such as accessibility in a current space, accessibility in an adjacent space, accessibility in a nesting space such as a floor building, campus or the like, accessibility in a nested space, or the like. Another display signal may include, without limitation, a display signal for map display, in which any map, as described above, of navigable space containing first transmitter, nesting navigable spaces, and/or nested navigable spaces, may be displayed; map may, for instance permit panning, rotating, and/or zooming to view two-dimensional and/or three-dimensional map data of current, nested, and/or nesting spaces, such as ability to view current navigable space, to zoom in to see a nested navigable space, and/or zoom out to view a nesting navigable space. As a further non-limiting example, a display signal of plurality of display signals 128a-n may include a display signal for receiving user inputs requesting navigation instructions and/or displaying navigation instructions; generation and/or display of navigation instructions may be performed according to any embodiments therefor disclosed in U.S. Nonprovisional application Ser. No. 16/247,547. As another non-limiting example, a data signal of plurality of data signals may be dedicated to usage instructions, including display of generated usage instructions and/or user inputs requesting usage instructions; generation and/or display of usage instruction may be performed according to any embodiment therefor described in U.S. Nonprovisional application Ser. No. 16/247,547. Another non-limiting example of a display signal of plurality of display signals 128a-n may include a display signal displaying schedule data within a current navigable space, a nested navigable space, and/or a nesting navigable space, such as without limitation class schedules, game schedules, performance schedules, or the like. As a further example, a display signal of plurality of display signals 128a-n may include a display signal that provides safety information concerning a current space, nesting space, and/or nested space. In another non-limiting example a display signal of plurality of display signals 128a-n may display floor change information, such as how and where to get from a building floor containing current navigable space to a different building floor. As an additional non-limiting example, a display signal of plurality of display signals 128a-n may provide information describing contents, seating, and/or layout of current navigable space, a nested navigable space, and/or a nesting navigable space. Plurality of display signals 128a-n may include a display signal for viewing and/or requesting products and/or services, such as room service at a hotel, menu items at a restaurant, bar, or café, concessions at a ballpark, or the like. Plurality of display signals 128a-n may include a display signal at which a user can ask and/or submit questions, submitting quiz responses, perform classwork, submit exam answers, or the like.

In an embodiment, and still referring to FIG. 1, contents of one or more display signals 128a-n may depend on contextual information as described above; data included in any display signal may be filtered and/or selected based on any contextual datum and/or data. For instance, and without limitation, a display signal for displaying maps may contain details of maps selected and/or filtered by contextual data such as without limitation user group data; as a non-limiting example, a map of a current, nested, and/or nesting navigable space may include wiring map information for a user having group association indicative that the user is an electrician, plumbing information for a user having group association indicative that the user is a plumber, maintenance access information for a user having group association indicative that the user is a repair worker, or excluding any of the above for users not belonging to the above groups. As a further non-limiting example, data provided in a display signal for displaying schedules may be filtered and/or selected according to one or more elements of user and/or user group information, such as listing classes, performances, games, and/or reservations at which user is expect and/or authorized to attend, or the like. As an additional non-limiting example, data provided in a display signal for displaying navigational sequences may be filtered and/or selected according to one or more elements of user and/or user group information, such as, without limitation a user's accessibility needs; for instance, a wheelchair-bound user may be provided wheelchair-accessible navigation instructions or the like.

As a further non-limiting example, and still referring to FIG. 1, data provided in a display signal for displaying emergency instructions and/or information may depend on a current emergency status and/or risk level; for instance, a degree of current risk of fire, terrorism, criminal activity, or the like, a current event with potential local consequences such a flood watch, tornado watch, and/or tornado warning, and/or an alert to a current emergency situation such as an active shooter, fire, flood, storm or the like with instructions for how to respond may be displayed. Emergency display signal may alternatively or additionally depend on user group information, such as without limitation a first set of instructions and/or information for users who are students or other members of a civilian population, a second set of instructions and/or information for law enforcement and/or security personnel, a third set of instructions and/or information for firefighters, a fourth set of instructions and/or information for medical first responders, or the like. As another non-limiting example, data provided by or via a safety-related display signal may depend on user information; such user information may include particular vulnerabilities and/or existing health conditions of a user, such as prominent display of defibrillation stations for users tending to fibrillation, information concerning allergens and/or irritants that data suggests affect a particular user, or the like. Such user information may include accessibility information for users with disabilities such as movement impairment and/or visual impairment; evacuation routes and/or instructions for operation of safety equipment and/or facilities may depend, for instance, on what means are at a user's disposal to navigate through a navigable space, for instance as described in U.S. Nonprovisional application Ser. No. 16/247,547, and/or what routes, such as ramps and/or elevators versus stairs, routes with bannisters, or the like, support a user's mobility needs. Each of the above differences and/or modifications in display signal data may be accomplished by retrieval thereof from datastores and/or data structures according to contextual data as described above.

A "contextual datum" as used in this disclosure is any element of data, excepting location identifier, usable to select a subset of location-specific data. A contextual datum may include, without limitation, data describing a user. For instance, and without limitation, data describing a user may indicate whether a user is permitted to receive information describing how to operate and/or repair equipment. User access privileges, rights, and/or restrictions may be determined by determining user membership in one or more groups according to group information provided in a user profile, such as user membership in a military organization, user membership in a company or factory, a user position or rank, or the like. Group information may be information concerning a group of users related by a particular interest or other commonality. Data describing a user may, as an additional non-limiting example, specify a default user medical need, such as, without limitation, a user with a heart condition having a default medical need relating to treatment of arrhythmia, cardiac arrest, or the like. Any data entered or contained in system 100 with respect to and/or linked to unique identifier and/or any transmitter may be associated with one or more access levels or controls, including without limitation data limited to only a single user, data available only to a group of users, and/or data available to any user operating system 100 and/or any device or component included within system. Thus, for instance, a first user operating a portable computing device 104 as disclosed herein may be presented with a first set of information linked to at least a first transmitter, while a second user may be presented with a second set of information; first set may differ from second set, for instance and without limitation by exclusion from second set of private and/or group-related information linked to first user and not second user, and/or by inclusion of private and/or group-related information linked to second user and not first user. Further continuing the example, first set and second set may have in common data that is publicly available and/or data linked to a group in which both first user and second user are members. Contextual data may include historical contextual data, which may include any historical data about location and/or items therein, such as without limitation data describing, people, items, events, construction, additions, or the like. Contextual data may include any contextual and/or regional descriptive data as described in U.S. Nonprovisional application Ser. No. 16/783,938, filed on Feb. 6, 2020 and entitled "METHODS AND SYSTEMS FOR WIRELESS ACQUISITION AND PRESENTATION OF LOCAL SPATIAL INFORMATION," the entirety of which is incorporated herein by reference.

Still referring to FIG. 1, data describing a user may be retrieved using a user identifier, which may be retrieved from memory of portable computing device 104 and/or another device in system 100. Retrieving user identifier may include retrieving an identifier unique to user; alternatively or additionally, retrieving user identifier may include retrieving one or more group identifiers linked to user identifier, where the group identifiers may, without limitation, identify groups of user identifiers having common interests, common needs for assistance or accommodation, or access privileges. For instance, may at least a group identifier may identify a group of users that are affiliated with an institution, company, business, or club, a group of users with a certain degree of visual or mobility impairment, or the like; each user identifier may be associated with one or many groups and/or group identifiers. Any group identifier may have any structure or contents suitable for use as a user identifier, and may be produced, generated, or received according to any process or using any device or module suitable for production, generation, or reception of a user identifier. Groups may be organized according to any common need for accommodation and/or class of impairment; for instance, a first group may be linked to visual impairment and concomitant need for usage instructions that do not rely on sight for performance, while a second group may be linked to a physical impairment such as lowered mobility or dexterity, such that usage instructions assume use of, for instance, tools to aid with reach, grip, or the like. Groups may include at least a group identified by a common interest, such as a hobby or profession; thus if user belongs to a group of mechanics, and item includes a device or element that may be repaired by a mechanic, usage instruction may be generated using stored steps or step sequences describing processes for repair or modification of item by a mechanic. Data describing a user may include an identifier of a user of portable computing device 104, a name, address, electronic mail address, account number, username, phone number, or other identifying and/or contact information of a user, one or more groups in which user is a member, and/or one or more accessibility needs the user is recorded as having.

Still referring to FIG. 1, contextual data may include, without limitation, a current time, a schedule status such as without limitation whether a class, game, performance or the like is about to start or is in session, whether a given venue such as restaurant, laboratory, classroom, or the like is open, what menu at a restaurant is available, or the like, a reservation status, such as whether a navigable space or a resource therein is reserved, an emergency status, or any other example that may be described in this disclosure or may occur to persons skilled in the art. Contextual data may include one or more user-entered instructions, such as user-entered instructions as described in U.S. Nonprovisional application Ser. No. 16/247,547, filed on Jan. 1, 2019, and entitled "DEVICES SYSTEMS, AND METHODS FOR NAVIGATION AND USAGE GUIDANCE IN A NAVIGABLE SPACE USING WIRELESS COMMUNICATION," the entirety of which is incorporate herein by reference. One or more contextual data may include, without limitation, one or more elements of user history, such as without limitation past user actions, commands, and/or selections in system 100 and/or entered on portable computing device 104, either in general or per contextual datum such as time, place, schedule, or the like. One or more elements of contextual data may include a user goal, which may be determined, without limitation, as described in U.S. Nonprovisional application Ser. No. 16/247,547.

Still referring to FIG. 1, plurality of display signals 128a-n includes an element of location-specific data. Computing device 104 may retrieve element of location-specific data from database 116, a remote device 120, or the like. Retrieval of plurality of location-specific data may be performed using solely location identifier. Alternatively or additionally, retrieval of plurality of location-specific data may be performed using at least a contextual datum. A "contextual datum" as used in this disclosure is any element of data, excepting location identifier, usable to select a subset of location-specific data. A contextual datum may include, without limitation, data describing a user. For instance, and without limitation, data describing a user may indicate whether a user is permitted to receive information describing how to operate and/or repair equipment. User access privileges, rights, and/or restrictions may be determined by determining user membership in one or more groups according to group information provided in a user profile, such as user membership in a military organization, user membership in a company or factory, a user position or rank, or the like. Group information may be information concerning a group of users related by a particular interest or other commonality. Data describing a user may, as an additional non-limiting example, specify a default user medical need, such as, without limitation, a user with a heart condition having a default medical need relating to treatment of arrhythmia, cardiac arrest, or the like. Any data entered or contained in system 100 with respect to and/or linked to unique identifier and/or any transmitter may be associated with one or more access levels or controls, including without limitation data limited to only a single user, data available only to a group of users, and/or data available to any user operating system 100 and/or any device or component included within system. Thus, for instance, a first user operating a portable computing device 104 as disclosed herein may be presented with a first set of information linked to at least a first transmitter, while a second user may be presented with a second set of information; first set may differ from second set, for instance and without limitation by exclusion from second set of private and/or group-related information linked to first user and not second user, and/or by inclusion of private and/or group-related information linked to second user and not first user. Further continuing the example, first set and second set may have in common data that is publicly available and/or data linked to a group in which both first user and second user are members.

Still referring to FIG. 1, data describing a user may be retrieved using a user identifier, which may be retrieved from memory of portable computing device 104 and/or another device in system 100. Retrieving user identifier may include retrieving an identifier unique to user; alternatively or additionally, retrieving user identifier may include retrieving one or more group identifiers linked to user identifier, where the group identifiers may, without limitation, identify groups of user identifiers having common interests, common needs for assistance or accommodation, or access privileges. For instance, may at least a group identifier may identify a group of users that are affiliated with an institution, company, business, or club, a group of users with a certain degree of visual or mobility impairment, or the like; each user identifier may be associated with one or many groups and/or group identifiers. Any group identifier may have any structure or contents suitable for use as a user identifier, and may be produced, generated, or received according to any process or using any device or module suitable for production, generation, or reception of a user identifier. Groups may be organized according to any common need for accommodation and/or class of impairment; for instance, a first group may be linked to visual impairment and concomitant need for usage instructions that do not rely on sight for performance, while a second group may be linked to a physical impairment such as lowered mobility or dexterity, such that usage instructions assume use of, for instance, tools to aid with reach, grip, or the like. Groups may include at least a group identified by a common interest, such as a hobby or profession; thus if user belongs to a group of mechanics, and item includes a device or element that may be repaired by a mechanic, usage instruction may be generated using stored steps or step sequences describing processes for repair or modification of item by a mechanic. Data describing a user may include an identifier of a user of portable computing device 104, a name, address, electronic mail address, account number, username, phone number, or other identifying and/or contact information of a user, one or more groups in which user is a member, and/or one or more accessibility needs the user is recorded as having.

Still referring to FIG. 1, contextual data may include, without limitation, a current time, a schedule status such as without limitation whether a class, game, performance or the like is about to start or is in session, whether a given venue such as restaurant, laboratory, classroom, or the like is open, what menu at a restaurant is available, or the like, a reservation status, such as whether a navigable space or a resource therein is reserved, an emergency status, or any other example that may be described in this disclosure or may occur to persons skilled in the art. Contextual data may include one or more user-entered instructions, such as user-entered instructions as described in U.S. Nonprovisional application Ser. No. 16/247,547, filed on Jan. 1, 2019, and entitled "DEVICES SYSTEMS, AND METHODS FOR NAVIGATION AND USAGE GUIDANCE IN A NAVIGABLE SPACE USING WIRELESS COMMUNICATION," the entirety of which is incorporate herein by reference. One or more contextual data may include, without limitation, one or more elements of user history, such as without limitation past user actions, commands, and/or selections in system 100 and/or entered on portable computing device 104, either in general or per contextual datum such as time, place, schedule, or the like. One or more elements of contextual data may include a user goal, which may be determined, without limitation, as described in U.S. Nonprovisional application Ser. No. 16/247,547.

Further referring to FIG. 1, display data structure 124 includes a display order for the plurality of data signals. Display order may include, without limitation, an initial display signal, of the plurality of display signals 128*a-n*. An "initial display signal" as used in this disclosure, is a display signal that display data structure 124 first currently displays. Initial display signal may depend on one or more elements of contextual data; for instance, and without limitation, initial display signal may be a first signal given a first set of contextual data and/or location identifier and a second display signal given a second set of contextual data and/or location identifier. A user may specify an initial display signal and/or an initial display signal per location identifier, per a given combination of location identifier and contextual datum and/or set of contextual data, or the like.

Alternatively or additionally, and still referring to FIG. 1, computing device 104 may determine selection of initial display signal given location identifier and/or contextual data. Selection of initial display signal may include selection of a default display signal; default may be a universal default, based on, for instance, a stored identifier of a default initial display, which may, in an embodiment, be selected in absence of any other data, such as without limitation for a new user that has not entered any information. Default signal may be location-specific, or in other words dependent on a navigable space in which computing device 104 is currently located. Default signal may be transmitter-specific, as selected for instance according to identifier of first transmitter. Default signal may be user-specific; for instance, computing device 104 and/or a remote device 120 in communication with computing device 104 may track user interactions with system 100 and identify a most frequently used display signal by user. Alternatively or additionally, selection of initial display signal may be performed by selection of a most frequently used display signal by user per another contextual datum, such as without limitation a display signal a user selects to use most frequently in a given location, at a given time, on a given weekday, at a given slot or moment in a schedule, after using a particular display signal, and/or any combination thereof.

In an embodiment, and still referring to FIG. 1, where multiple data such as first transmitter identifier and/or a plurality of contextual data are used in selecting initial display signal, selection of initial display signal may be performed using a classification algorithm. A "classification algorithm" is defined herein as a process whereby a computing device 104 derives, from training data, a model known as a "classifier" for sorting inputs into categories or bins of data. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers.

With continued reference to FIG. 1, training data, as used in this disclosure, is data containing correlations that a machine-learning process may use to model relationships between two or more categories of data elements. For instance, and without limitation, training data may include a plurality of data entries, each entry representing a set of data elements that were recorded, received, and/or generated together; data elements may be correlated by shared existence in a given data entry, by proximity in a given data entry, or the like. Multiple data entries in training data may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data according to various correlations; correlations may indicate causative and/or predictive links between categories of data elements, which may be modeled as relationships such as mathematical relationships by machine-learning processes as described in further detail below. Training data may be formatted and/or organized by categories of data elements, for instance by associating data elements with one or more descriptors corresponding to categories of data elements. As a non-limiting example, training data may include data entered in standardized forms by persons or processes, such that entry of a given data element in a given field in a form may be mapped to one or more descriptors of categories. Elements in training data may be linked to descriptors of categories by tags, tokens, or other data elements; for instance, and without limitation, training data may be provided in fixed-length formats, formats linking positions of data to categories such as comma-separated value (CSV) formats and/or self-describing formats such as extensible markup language (XML), enabling processes or devices to detect categories of data.

Alternatively or additionally, and still referring to FIG. 1, training data may include one or more elements that are not categorized; that is, training data may not be formatted or contain descriptors for some elements of data. Machine-learning algorithms and/or other processes may sort training data according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data to be made applicable for two or more distinct machine-learning algorithms as described in further detail below. Training data used by computing device 104 may correlate any input data as described in this disclosure to any output data as described in this disclosure.

Still referring to FIG. 1, classification algorithm may be implemented, as a non-limiting example, using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database 116, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 1, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute l as derived using a Pythagorean norm: $l=\sqrt{\Sigma_{i=0}^{n} a_i^2}$, where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values. As a non-limiting example, K-nearest neighbors algorithm may be configured to classify an input vector including a plurality of contextual data, potentially including first transmitter identifier, to a display signal of a plurality of display signals 128a-n.

In an embodiment, and still referring to FIG. 1, selection of initial display signal may include receiving an emergency notification and selecting an emergency display signal as a function of the emergency notification. Emergency notification may include, without limitation, data received over a network or the like that an emergency is currently underway, such as without limitation a current fire, tornado, flood, earthquake, terrorist attack, and/or active shooter, data received over a network or the like of an elevated probability of an emergency, such as without limitation a "watch" or "warning" of one or more potential emergencies such as fire, flood, tornado, and/or criminal or terrorist activity. Selection based on emergency notification may be used in conjunction with any or all other methods as described above; for instance, other display signals 128a-n may be placed in order of display after emergency display signal. Upon lapse of emergency, as for instance indicated by a subsequent communication over a network or the like of cessation of an emergency or reduction of probability of the emergency, such as cancelation of a "watch" or "warning," computing device 104 may select a new initial display tab using any or all methods described above, and may display the new initial display tab.

Still referring to FIG. 1, display order may include an order in which display signals 128a-n are provided chronologically and/or temporally. Order of display may depend on position data. Alternatively or additionally, selection of a second display signal, third display signal, and the like may be performed by repeating any display selection process described above with previously selected display signals 128a-n excluded from a set from which an instant display signal is to be selected. In an embodiment, display data structure 124 and/or computing device 104 may be configured to redetermine initial display signal periodically and/or upon detection of an event such as receipt of an external signal containing new and/or modified contextual data. For instance, display data structure 124 and/or computing device 104 may be configured to select a different display signal upon reception of data indicating that an emergency is taking place, that a class is starting, or the like.

Still referring to FIG. 1, computing device 104 is configured to record at least an element of contextual data. At least an element of contextual data may include any element of contextual data as described above. At least an element of contextual data may be recorded by capture, reception, retrieval or the like of contextual data according to any process described above.

Still referring to FIG. 1, computing device 104 is configured to generate a localized data record. A "localized data record," as used in this disclosure, is a data structure linking location identifier to one or more elements of data. Localized data record includes display data structure 124, location identifier, and an association of the at least an element of contextual data with the display order. Localized data record may be stored in a database 116. Database 116 may be implemented, without limitation, as a relational database 116, a key-value retrieval database 116 such as a NOSQL database 116, or any other format or structure for use as a database 116 that a person skilled in the art would recognize as suitable upon review of the entirety of this disclosure. Database 116 may alternatively or additionally be implemented using a distributed data storage protocol and/or data structure, such as a distributed hash table or the like. Database 116 may include a plurality of data entries and/or records as described above. Data entries in a database 116 may be flagged with or linked to one or more additional elements of information, which may be reflected in data entry cells and/or in linked tables such as tables related by one or more indices in a relational database 116. Persons skilled in the art, upon reviewing the entirety of this disclosure, will be aware of various ways in which data entries in a database 116 may store, retrieve, organize, and/or reflect data and/or records as used herein, as well as categories and/or populations of data consistently with this disclosure. Retrieval from database 116 using location identifier may be performed according to any process and/or process steps described above for retrieval of data using an identifier received and/or extracted from a wireless. "Location-specific data" as used herein is data that is retrieved based on the location identifier. Location-specific data may include any data belonging to any categories as described below. Database 116 may be edited by any computing device, as permitted according to access rules as described in this disclosure. For instance, and without limitation, computing device 104 and/or one or more remote devices may be able to remotely create and/or edit database 116 whether at wireless signal generator 108 and/or at other locations. One or more additional computing devices may be linked to remote device 120 and/or in communication therewith.

Further referring to FIG. 1, computing device 104 may be further configured to perform display of display data structure 124. For instance, and without limitation, computing device 104 may display initial display signal at a user output component. Displaying the initial display signal may include displaying data belonging to the subset of the plurality of categories of data included in the initial display signal. Association of at least an element of contextual data with a display order may include an association of an initial display signal of plurality of display signals 128a-n with an element of the at least an element of contextual data. This may be accomplished without limitation, according to any process as described above or below. Display may be performed according to display order; for instance, computing device 104 may select initial display signal and display initial display signal.

Still referring to FIG. 1, system 100 and/or computing device 104 may include a user output device 132. User output device 132 may include a display 136; the display 136 may be any display as described below. Display 136 may be a display of a mobile device such as a smartphone or tablet. User output device 132 may include an audio output device, such as a speaker, headphones, or a wireless headset such as those typically paired to a mobile device. User output device 132 may include a tactile output device.

In some embodiments, tactile output device is a device that outputs information that is intelligible using the sense of touch. Tactile output device may include a haptic output device such as a vibrator of a mobile device such as a smartphone, cellular phone, or tablet. In some embodiments, tactile output device produces patterns having geometric forms that are intelligible to the user using the sense of touch; for instance, tactile output device may output letters in braille using a set of retractable pins or bumps that can be extended and retracted to form braille characters, similarly to devices used with screen readers. Tactile output device may output other recognizable shapes, such as directional arrows or geometric forms; tactile output device may, as another example, output a map vignette of the immediate area including user features or any user feature data as described above. User output device 132 may be coupled to a mobile device; for instance, where computing device 104 includes a mobile device, user output device 132 may be coupled to the same mobile device. User output device 132 may be incorporated wholly or in part in a mobile device; for instance, user output device 132 may include the display 136 and speakers of the mobile device, as well as a tactile output device coupled to the mobile device. User output device 132 may be coupled directly to wireless receiver 112 and/or computing device 104 or may communicated with wireless receiver 112 and/or computing device 104 via a network; user output device 132 may be incorporated in or include a computing device 104 and/or any element thereof, including without limitation a processor, wireless or wired communication input/output devices, navigation facilities, and the like. User output device 132 is configured to receive data from computing device 104; data may be received from computing device 104 by any suitable electronic or wireless means. User output device 132 is configured to provide the received data to the user. In some embodiments, providing data signifies presenting the data to the user in a form in which the user can understand the data; for instance, if the user has some visual impairment but is capable of reading large type or similarly accentuated directional features such as large directional arrows, providing data may include displaying large type on a display 136, such as a mobile phone or tablet screen, or displaying large symbols such as directional arrows on the display 136. Similarly, if the user is visually impaired but able to hear, providing data may involve presenting the data by means of an audio output device. Where the user is not able to see or hear, presenting the regional descriptive data may include providing data using a tactile device. Providing data may also involve a combination of the above-described means; for instance, the regional descriptive data may be presented to the user in audio form, combined with large display of directional arrows or type, or with tactile information. User output device 132 may also be able to output content data. User output device 132 may also be able to output product data. Computing device 104 may cause display of display data structure 124 at user output device 132. User output device may include one or more holographic, augmented reality, and/or virtual reality displays, including without limitation heads-up displays, eye taps, augmented reality and/or virtual reality goggles and/or headsets, or the like.

With continued reference to FIG. 1, computing device 104 may be configured to retrieve and/or display one or more portions or aspects of display data structure 124. Computing device 104 may, as a non-limiting example, receive, from a wireless signal generator 108 located in a navigable space, a location identifier; reception may be performed in any manner described above. In an embodiment, computing device 104 may have location identifier stored in memory of computing device 104. Computing device 104 may retrieve, from a database 116, and using location identifier, a plurality of location-specific data. Database 116 may include any database 116, database 116, and/or data structure described above. Retrieval from database 116 using location identifier may be performed according to any process and/or process steps described above for retrieval of data using an identifier received and/or extracted from a wireless. "Location-specific data" as used herein is data that is retrieved based on the location identifier. Location-specific data may include any data belonging to any categories as described below.

Still referring to FIG. 1, plurality of location-specific data may include a plurality of categories of data as described above. Retrieval of plurality of location-specific data may be performed using solely location identifier. Alternatively or additionally, retrieval of plurality of location-specific data may be performed using at least a contextual datum, which may include any contextual data and/or datum as described above.

Still referring to FIG. 1, user-entered data may be retrieved using a user identifier, which may be retrieved from memory of computing device 104 and/or another device in system 100. Retrieving user identifier may include retrieving an identifier unique to user; alternatively or additionally, retrieving user identifier may include retrieving one or more group identifiers linked to user identifier, where the group identifiers may, without limitation, identify groups of user identifiers having common interests, common needs for assistance or accommodation, or access privileges. For instance, may at least a group identifier may identify a group of users that are affiliated with an institution, company, business, or club, a group of users with a certain degree of visual or mobility impairment, or the like; each user identifier may be associated with one or many groups and/or group identifiers. Any group identifier may have any structure or contents suitable for use as a user identifier, and may be produced, generated, or received according to any process or using any device or module suitable for production, generation, or reception of a user identifier. Groups may be organized according to any common need for accommodation and/or class of impairment; for instance, a first group may be linked to visual impairment and concomitant need for usage instructions that do not rely on sight for performance, while a second group may be linked to a physical impairment such as lowered mobility or dexterity, such that usage instructions assume use of, for instance, tools to aid with reach, grip, or the like. Groups may include at least a group identified by a common interest, such as a hobby or profession; thus if user belongs to a group of mechanics, and item includes a device or element that may be repaired by a mechanic, usage instruction may be generated using stored steps or step sequences describing processes for repair or modification of item by a mechanic. User-entered data may include an identifier of a user of computing device 104, a name, address, electronic mail address, account number, username, phone number, or other identifying and/or contact information of a user, one or more groups in which user is a member, and/or one or more accessibility needs the user is recorded as having.

With continued reference to FIG. 1, contextual data may be used to refine a query to one or more data sources, for instance and without limitation by generating a query to database 116 that includes one or more contextual data in addition to identifier of first transmitter. Alternatively or additionally, contextual data may be used to select one or more databases, tables, and/or other repositories of data included in database 116 to which a query may be submitted. As a non-limiting example, retrieval of data from database 116 may be on a "need to know" and/or user role or group-specific basis, such as retrieval of wiring information to provide to electricians, or other examples as described in further detail below.

Still referring to FIG. 1, computing device 104 generates a user-interfacing data structure including a plurality of display signals 128a-n. Each display signal of plurality of display signals 128a-n includes a subset of the plurality of categories of data, and each subset of the plurality of display signals 128a-n differs from each other subset of the plurality of display signals 128a-n. A first subset of the plurality of categories of data may differ from a second subset of the plurality of categories of data.

Further referring to FIG. 1, computing device 104 may select an initial display signal. This may be performed according to any process and/or using any selection criteria for selection of an initial display signal as described above; initial display signal may be selected, without limitation, using contextual data, location-specific data, data describing user, or the like. Displaying initial display signal may include displaying data belonging to the subset of the plurality of categories of data included in the initial display signal. Data to be displayed in display signal may be determined as described above. In an embodiment, computing device 104 may determine an order of display signals 128a-n. Order of signals may be determined by ranking display signals 128a-n according to frequency of use, frequency of use per contextual datum, and/or degree of proximity to first transmitter identifier and a plurality of contextual data according to a classifier as described above; for instance, where classifier is a KNN classifier, initial display signal may be a nearest display signal, a next-nearest display signal may be next in order of display, and so forth. Order of display may, for instance, place initial display signal on "top" with a next adjacent tab or the like being for the next display signal in order of display, and subsequent tabs or the like for subsequent elements in order of display.

Still referring to FIG. 1, computing device 104 may detect an event that triggers a change in current display signal. Event may include user selection of another display signal of plurality of display signals 128a-n. Event may include receiving an external signal received such as an emergency notification as described above, a signal from another transmitter, which may be any transmitter suitable for use as first transmitter as described above, a passage of some period of time, a change in schedule, completion of a process and/or task on current display signal, or the like. Switch to a new current display signal may be performed, without limitation, by selecting new current display signal according to any process and/or process step described above, including without limitation using contextual data, a classifier, or the like.

Further referring to FIG. 1, computing device 104 may display initial display signal at a user output component. Displaying initial display signal may include displaying data belonging to the subset of the plurality of categories of data included in the initial display signal. Initial display signal may be selected according to any criteria described above, including without limitation contextual data, data describing a user, location-specific data, and/or location identifiers. For instance, computing device may provide different location-specific data, different display signals, and/or different selections of display signals for different people based on roles, categories of people, group membership, or the like. In an embodiment, users may be able to add data, for instance to be linked to location identifier and a user identifier of such users; such data may be stored locally and/or in a user-linked data record, which may be created as described above. Note that location-specific data record may receive location-specific data and/or user-entered data by receiving data from a previous location-specific data record; thus, methods described herein may be performed iteratively and/or recursively. In an embodiment, a user may be able to edit only data records and/or display data structures created by that user and/or a group of users to which that user belongs. A user may enter commands traversing data, for instance by "playing" through in a default order as described above and/or in an order specified by one or more user entries, including activation of scroll buttons, verbal commands to go up or down, commands to traverse blocks of a given type, and/or by one or more touch-screen actions such as "swiping," "sliding," or other actions, which may be specified to be in a given direction such as up, down, left, right, or the like.

Figure 2A:
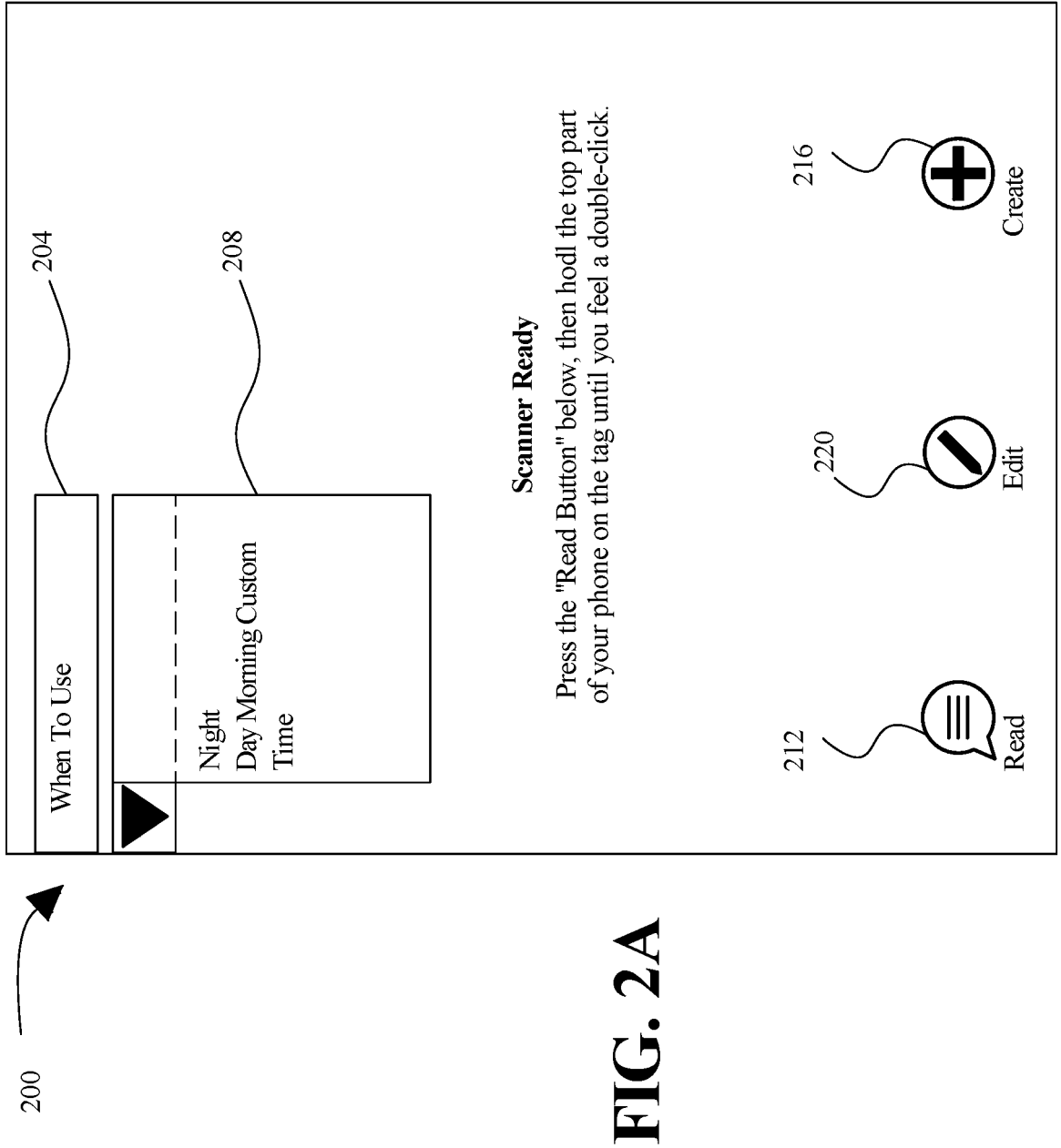
FIGS. 2A-B are block diagrams of an exemplary embodiment of an input user interface.

Referring now to FIG. 2A, an exemplary embodiment of an input user interface 200 for input of user-entered data as described above is provided. Input user interface 200 may be provided to a user via user output device 132; input user interface 200 may be provided according to any output device and/or procedure described above, including without limitation display, audio output including without limitation text-to-speech output, tactile output, or the like. Input user interface 200 may include an input prompt 204 directing a user to input one or more elements of data and/or describing how to input such one or more elements. Input user interface 200 may include an input field 208 in which a user can input data, for instance by selection of one or more options, entry of text, browsing for locally stored data such as images, videos, and/or audio files, capture of data such as images, videos, and/or audio files using input devices, or the like. A "read" button 212 may enable a user to receive location identifier and/or other identifiers or data from wireless signal generator. Selection of a "create" button 216 may enable a user to enter a new block of data. Block of data may be of any suitable type, including without limitation a text field, a heading field, a link field, an image filed, an audio field, a date field, a time filed, a video field, an email field, and/or a phone field. Selection of any such block type may cause display of a template for entry of data corresponding to that block type. For instance, and without limitation, any block template may permit entry of a label for a block to be created, fields such as link and/or image fields may permit entry of hyperlinks such as URL hyperlinks or the like, fields that may not display and/or be accessible for certain users may provide alt-text fields describing what cannot be detected under some circumstances, and for block types for which browsing and/or capture is appropriate, such as image, video, and/or audio block types, fields for browsing and/or capture may be provided. There may also be "custom" fields, which may permit a user to specify a content type of a field. A user may be able to set and/or modify access and/or edit permissions for a block, for instance limiting to the user, permitting access and/or editing for members of a given group of users, permitting access and/or editing for users of a given category, permitting access and/or editing for all users, or the like. Time fields and/or date fields may alternatively or additionally be populated by a timestamp using a current time as of creation and/or user activation of a button or event handler for generation of timestamp. An "edit" button 220 may recall one or more blocks for editing and/or permit editing of display of blocks by, for instance, changing order thereof or the like.

Figure 2B:
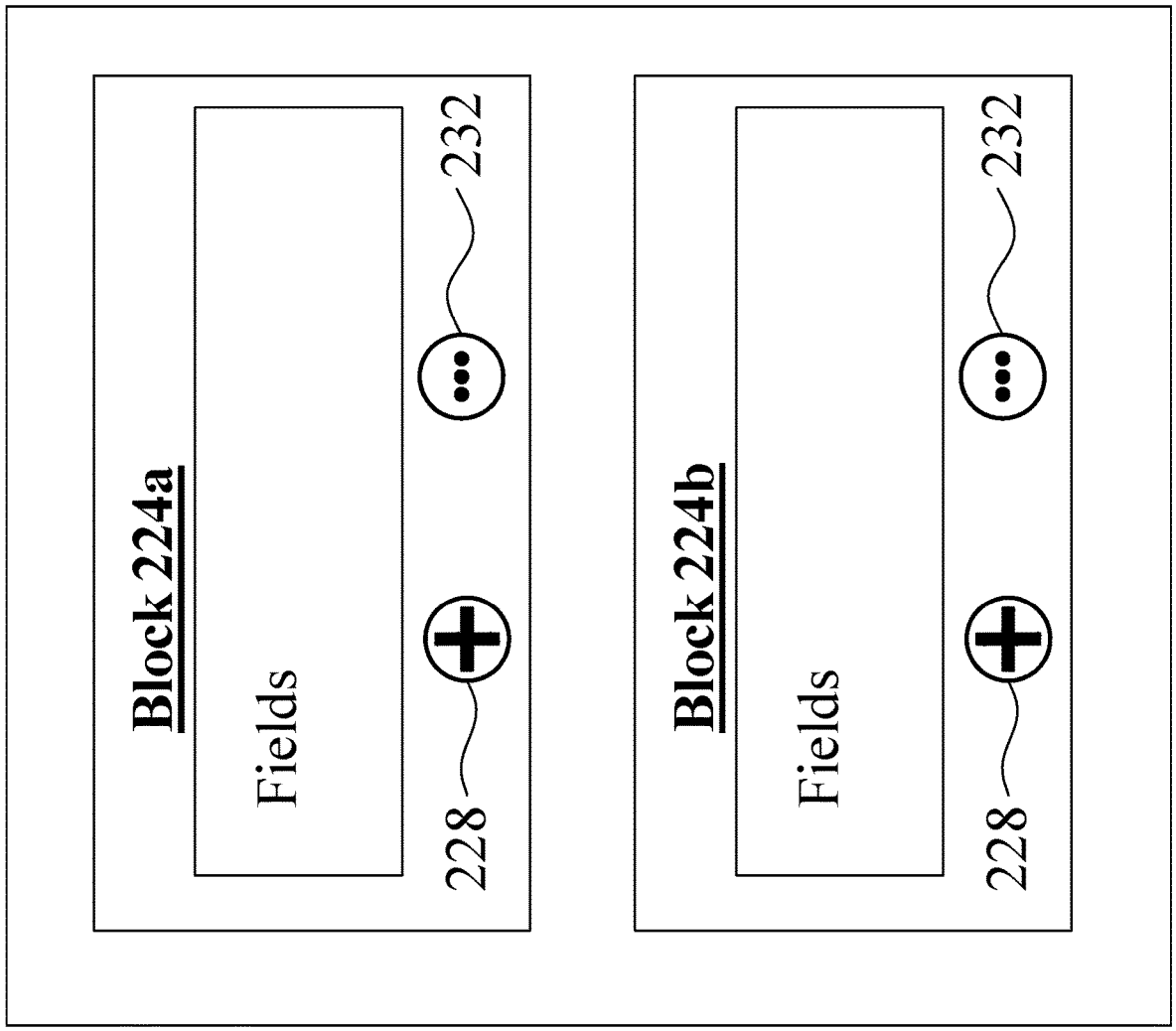

Referring now to FIG. 2B, an exemplary embodiment of a view in input data structure 200 is provided showing a plurality of blocks 224a-b. Each block of plurality of blocks may be moved up or down in display and/or traversal order as described above. Each block may have an edit button 228 for modification, addition, and/or removal of fields. Edit button may alternatively or additionally be activated to add another block of information. An "actions" button 232 may be provided to edit a block by performing one or more actions on the block, such as providing users with additional actions such as modifying a position in an order, changing access and/or edit permissions, deletion, addition before or after block of a new block, or the like. Any standard method of adding information may be employed, including without limitation any manner described above for entry of user-entered data. Any method of performing actions on items may be employed, including without limitation creating a selection set of items and right-clicking or otherwise entering a command to see actions that can be applied or selecting a menu/list of actions that can be applied. Persons skilled in the art, upon reviewing the entirety of this disclosure, will be aware of various alternative of additional ways in which editing and/or addition of data may be performed. Editing may permit a user to modify an image shape, for instance making the image square, round, fade out, be a wallpaper/background, or the like. A user may be able to add metadata using actions button 232 or the like. A user may be able to add additional blocks at a top or bottom of display view and/or display signal.

Figure 3:
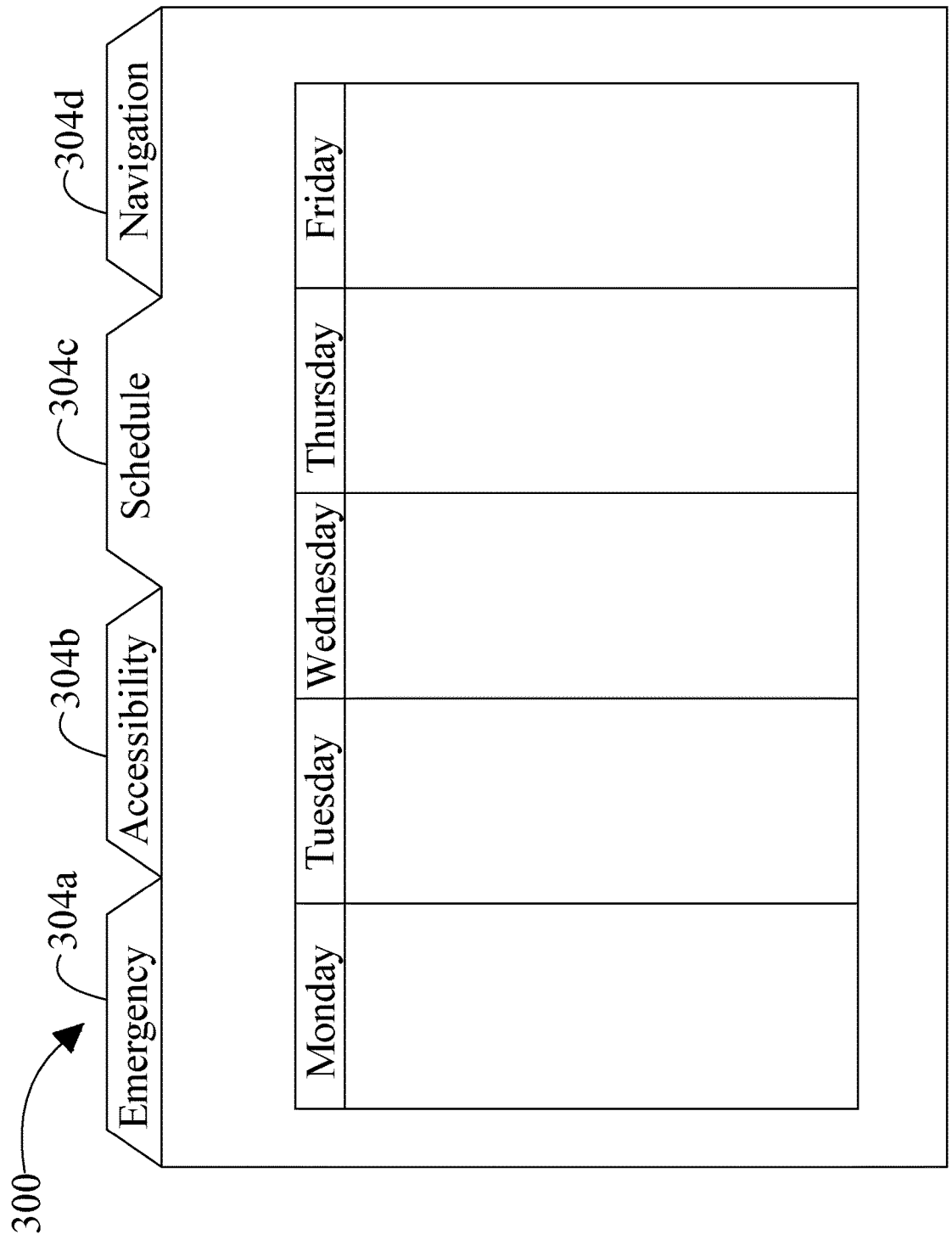
FIG. 3 is a block diagram of an exemplary embodiment of an output of a display data structure to a display.

Referring now to FIG. 3, an exemplary embodiment of an output 300 of a display data structure 124 to a display is illustrated. Output 300 may provide a user a current display view 304c of a plurality of display views 304a-d, displaying a current display signal of a plurality of display signals 128a-n, where a current display view 304c may be a view outputting a display signal of a plurality o of display signals 128a-n selected by user and/or according to systems and/or methods described below. User may be able to toggle and/or switch between display views 304a-d, for instance by selecting tabs, links, buttons, or the like that command user interfacing data structure and/or display to select a different display signal of plurality of display signals 128a-n 304a-d to display; selection of a different display signal and/or view by user and/or an automated process may cause that display signal to become a current display signal, output in a current display view, and replace the previous current display signal. Toggling between display signals 128a-n and/or views may be performed, as an additional non-limiting example, by one or more programs and/or functions, which may start automatically and/or in response to any user input and/or command.

Figure 4:
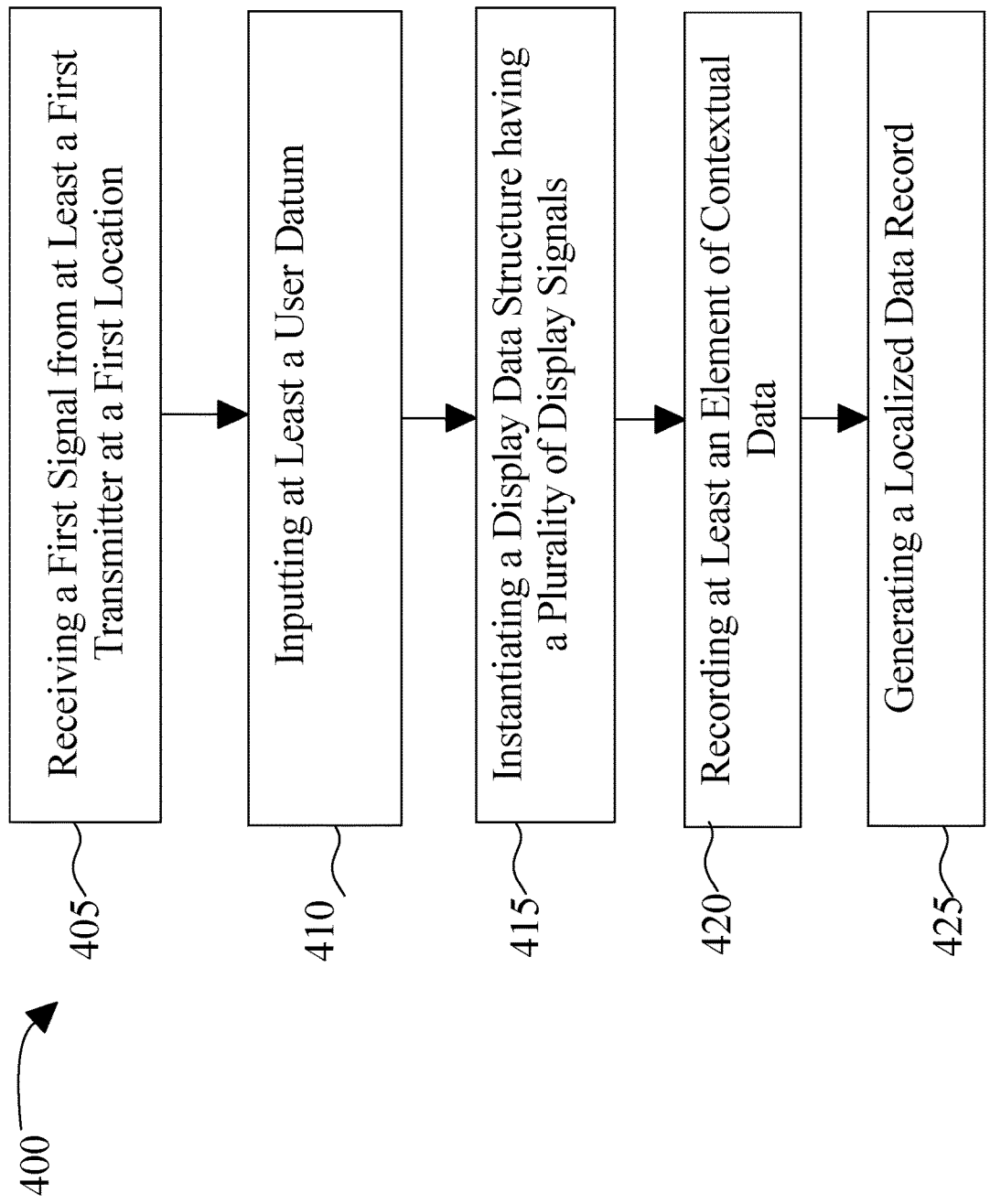
FIG. 4 is a flow diagram of an exemplary embodiment of a method of localized information provision using wireless communication.

Referring now to FIG. 4, an exemplary embodiment of a method 400 of localized information provision using wireless communication is illustrated. At step 405, a computing device 104 receives, from a wireless signal generator 108 located in a navigable space, a location identifier; this may be implemented, without limitation, as described above in reference to FIGS. 1-3. Receiving location identifier may include wirelessly transmitting, via an antenna communicatively connected to the computing device 104, an interrogation signal providing electrical power to wireless signal generator 108, and wirelessly receiving from the wireless signal generator 108, and via the antenna, a return signal.

At step 410, and still referring to FIG. 4, computing device 104 inputs at least a user-entered data associated with location identifier; this may be implemented, without limitation, as described above in reference to FIGS. 1-3.

At step 415, and with continued reference to FIG. 4, computing device 104 instantiates a display data structure 124 as a function of at least a user-entered datum; this may be implemented, without limitation, as described above in reference to FIGS. 1-3. Display data structure 124 includes a plurality of data signals including at least a user-entered datum. Each display signal of plurality of display signals 128a-n includes a subset of a plurality of categories of data. Display data structure 124 includes a display order for plurality of data signals. Each subset of plurality of display signals 128a-n may differ from each other subset of the plurality of display signals 128a-n. Display order may include an initial display signal of plurality of display signals 128a-n. Plurality of display signals 128a-n may include an element of location-specific data.

At step 420, and still referring to FIG. 4, computing device 104 records at least an element of contextual data; this may be implemented, without limitation, as described above in reference to FIGS. 1-3. At least an element of contextual data may include at least a past user interaction. At least an element of contextual data may include an element of temporal information. At least an element of contextual data may include an element of emergency information.

At step 425, and continuing to refer to FIG. 4, computing device 104 generates a localized data record; this may be implemented, without limitation, as described above in reference to FIGS. 1-3. Localized data record further includes display data structure 124. Localized data record includes location identifier. Localized data record includes an association of at least an element of contextual data with display order. Association of at least an element of contextual data with display order may include an association of an initial display signal of plurality of display signals 128a-n with an element of the at least an element of contextual data. Computing device 104 may display the display data structure 124.

Figure 5:
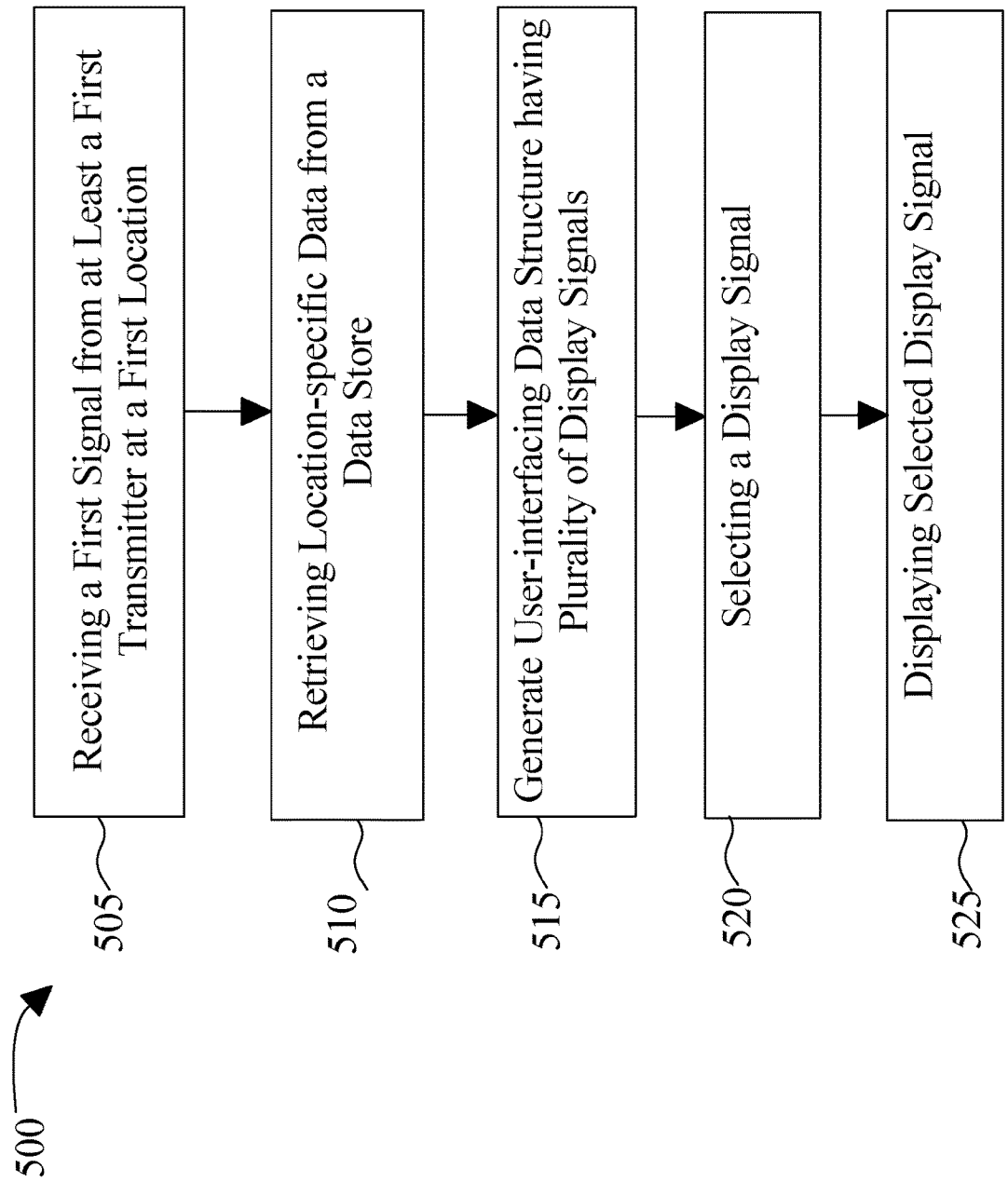
FIG. 5 is a flow diagram of an exemplary embodiment of a method of localized information provision using wireless communication.

Referring now to FIG. 5, an exemplary embodiment of a method 500 of localized information provision using wireless communication is illustrated. At step 505, computing device 104 receives, from a wireless signal generator 108 located in a navigable space, a location identifier; this may be implemented, without limitation, as described above in reference to FIGS. 1-4.

At step 510, and still referring to FIG. 5, computing device 104 retrieves, from a database 116, and using the location identifier, a plurality of location-specific data, wherein the plurality of location-specific data includes a plurality of categories of data; this may be implemented, without limitation, as described above in reference to FIGS. 1-4.

At step 515, and with continued reference to FIG. 5, computing device 104 generates a display data structure 124 having a plurality of display signals 128a-n; this may be implemented, without limitation, as described above in reference to FIGS. 1-4. Each display signal of plurality of display signals 128a-n includes a subset of plurality of categories of data. Each subset of the plurality of display signals 128a-n may differ from each other subset of the plurality of display signals 128a-n.

At step 520, and still referring to FIG. 5, computing device 104 selects an initial display signal of plurality of display signals 128a-n; this may be implemented, without limitation, as described above in reference to FIGS. 1-4.

At step 525, and continuing to refer to FIG. 5, computing device 104 displays initial display signal at a user output component; this may be implemented, without limitation, as described above in reference to FIGS. 1-4. Displaying the initial display signal includes displaying data belonging to subset of plurality of categories of data included in initial display signal.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random-access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 6:
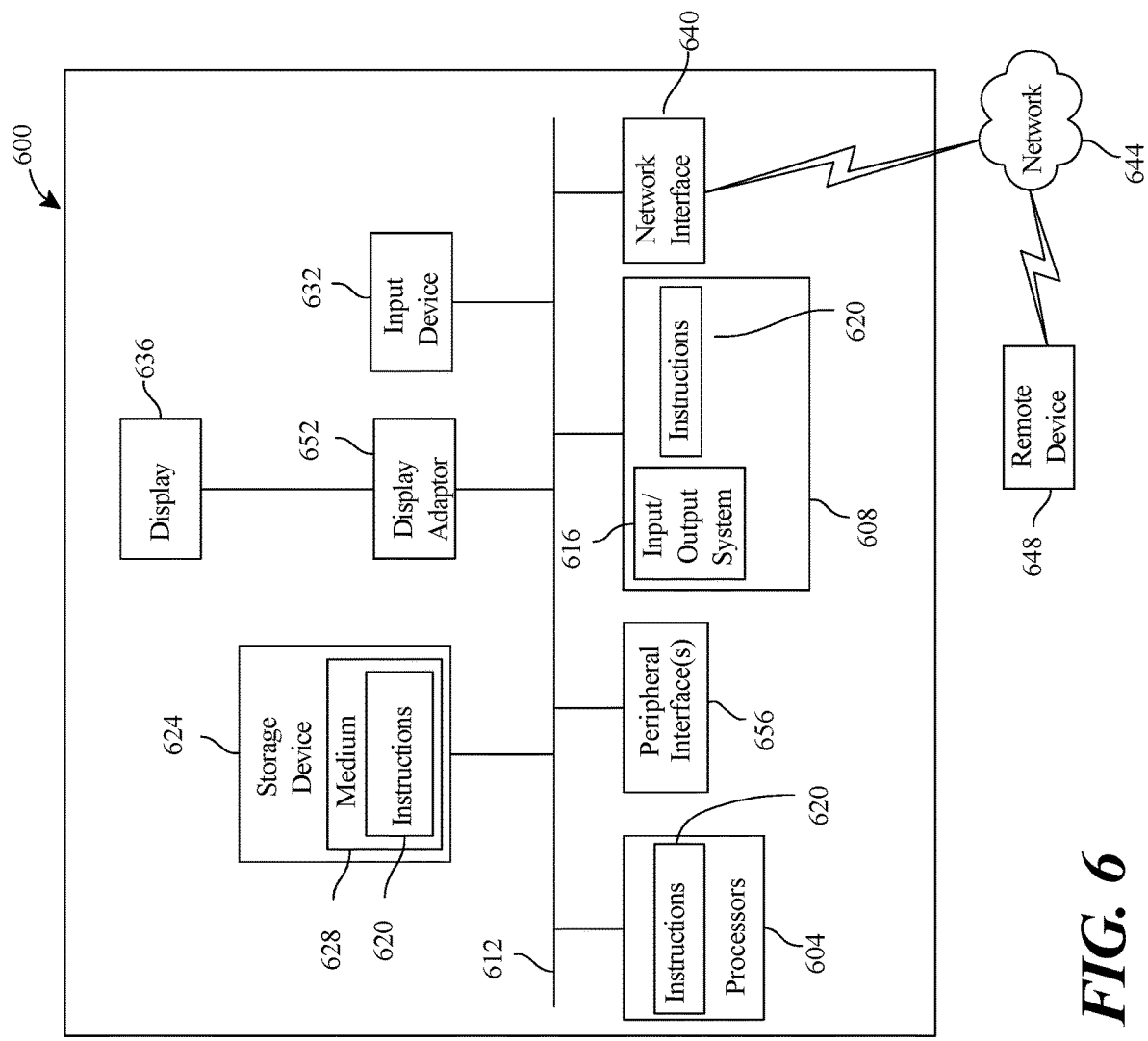
FIG. 6 is a block diagram of a computing system that can be used to implement any one or more of the methodologies disclosed herein and any one or more portions thereof.

FIG. 6 shows a diagrammatic representation of one embodiment of a computing device in the exemplary form of a computer system 600 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 600 includes a processor 604 and a memory 608 that communicate with each other, and with other components, via a bus 612. Bus 612 may include any of several types of bus structures including, but not limited to, a memory bus, a memory controller, a peripheral bus, a local bus, and any combinations thereof, using any of a variety of bus architectures.

Processor 604 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 604 may be organized according to Von Neumann and/or Harvard architecture as a non-limiting example. Processor 604 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating-point unit (FPU), and/or system on a chip (SoC).

Memory 608 may include various components (e.g., machine-readable media) including, but not limited to, a random-access memory component, a read only component, and any combinations thereof. In one example, a basic input/output system 616 (BIOS), including basic routines that help to transfer information between elements within computer system 600, such as during start-up, may be stored in memory 608. Memory 608 may also include (e.g., stored on one or more machine-readable media) instructions (e.g., software) 620 embodying any one or more of the aspects and/or methodologies of the present disclosure. In another example, memory 608 may further include any number of program modules including, but not limited to, an operating system, one or more application programs, other program modules, program data, and any combinations thereof.

Computer system 600 may also include a storage device 624. Examples of a storage device (e.g., storage device 624) include, but are not limited to, a hard disk drive, a magnetic disk drive, an optical disc drive in combination with an optical medium, a solid-state memory device, and any combinations thereof. Storage device 624 may be connected to bus 612 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 624 (or one or more components thereof) may be removably interfaced with computer system 600 (e.g., via an external port connector (not shown)). Particularly, storage device 624 and an associated machine-readable medium 628 may provide nonvolatile and/or volatile storage of machine-readable instructions, data structures, program modules, and/or other data for computer system 600. In one example, software 620 may reside, completely or partially, within machine-readable medium 628. In another example, software 620 may reside, completely or partially, within processor 604.

Computer system 600 may also include an input device 632. In one example, a user of computer system 600 may enter commands and/or other information into computer system 600 via input device 632. Examples of an input device 632 include, but are not limited to, an alphanumeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 632 may be interfaced to bus 612 via any of a variety of interfaces (not shown) including, but not limited to, a serial interface, a parallel interface, a game port, a USB interface, a FIREWIRE interface, a direct interface to bus 612, and any combinations thereof. Input device 632 may include a touch screen interface that may be a part of or separate from display 636, discussed further below. Input device 632 may be utilized as a user selection device for selecting one or more graphical representations in a graphical interface as described above.

A user may also input commands and/or other information to computer system 600 via storage device 624 (e.g., a removable disk drive, a flash drive, etc.) and/or network interface device 640. A network interface device, such as network interface device 640, may be utilized for connecting computer system 600 to one or more of a variety of networks, such as network 644, and one or more remote devices 648 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 644, may employ a wired and/or a wireless mode of communication. In general, any network topology may be used. Information (e.g., data, software 620, etc.) may be communicated to and/or from computer system 600 via network interface device 640.

Computer system 600 may further include a video display adapter 652 for communicating a displayable image to a display device, such as display device 636. Examples of a display device include, but are not limited to, a liquid crystal display (LCD), a cathode ray tube (CRT), a plasma display, a light emitting diode (LED) display, and any combinations thereof. Display adapter 652 and display device 636 may be utilized in combination with processor 604 to provide graphical representations of aspects of the present disclosure. In addition to a display device, computer system 600 may include one or more other peripheral output devices including, but not limited to, an audio speaker, a printer, and any combinations thereof. Such peripheral output devices may be connected to bus 612 via a peripheral interface 656. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A system for localized information provision using wireless communication, the system comprising a computing device comprising circuitry designed and configured to:
   download, at a first location, a localized data record associating at least an element of contextual data with a display data structure;
   receive, from a wireless signal generator located at a second location, a location identifier;
   retrieve the display data structure from the localized data record;
   record at least an element of contextual data; and
   instantiate the display data structure as a function of the at least an element of contextual data and the localized data record.

2. The system of claim 1, wherein the first location has a network connection, and the second location does not have a network connection.

3. The system of claim 1, wherein receiving the location identifier further comprises:
   wirelessly transmitting, via an antenna communicatively connected to the computing device, an interrogation signal providing electrical power to the wireless signal generator; and
   wirelessly receiving from the wireless signal generator, and via the antenna, a return signal.

4. The system of claim 1, wherein the at least an element of contextual data includes an element of emergency information.

5. The system of claim 1, wherein the display data includes a plurality of data signals.

6. The system of claim 1, wherein each display signal of the plurality of display signals includes a subset of a plurality of categories of data.

7. The system of claim 4, wherein each respective subset of each display signal of the plurality of display signals differs from each other respective subset of the plurality of display signals.

8. The system of claim 4, wherein the display data structure includes a display order for the plurality of data signals.

9. The system of claim 6 wherein the localized data record includes an association of the at least an element of contextual data with the display order.

10. The system of claim 6, in which the display order further includes an initial display signal of the plurality of display signals.

11. A method of localized information provision using wireless communication, the method comprising:
   downloading, by a computing device and at a first location, a localized data record associating at least an element of contextual data with a display data structure;

receiving, by the computing device and from a wireless signal generator located at a second location, a location identifier;

retrieving, by the computing device, the display data structure from the localized data record;

recording, by the computing device, at least an element of contextual data; and instantiating, by the computing device, the display data structure as a function of the at least an element of contextual data and the localized data record.

12. The method of claim 11, wherein the first location has a network connection, and the second location does not have a network connection.

13. The method of claim 11, wherein receiving the location identifier further comprises:

wirelessly transmitting, via an antenna communicatively connected to the computing device, an interrogation signal providing electrical power to the wireless signal generator; and wirelessly receiving from the wireless signal generator, and via the antenna, a return signal.

14. The method of claim 11, wherein the at least an element of contextual data includes an element of emergency information.

15. The method of claim 11, wherein the display data includes a plurality of data signals.

16. The method of claim 11, wherein each display signal of the plurality of display signals includes a subset of a plurality of categories of data.

17. The method of claim 14, wherein each respective subset of each display signal of the plurality of display signals differs from each other respective subset of the plurality of display signals.

18. The method of claim 14, wherein the display data structure includes a display order for the plurality of data signals.

19. The method of claim 16 wherein the localized data record includes an association of the at least an element of contextual data with the display order.

20. The method of claim 16, in which the display order further includes an initial display signal of the plurality of display signals.

* * * * *